US012775807B2

(12) United States Patent
Durvasula et al.

(10) Patent No.: US 12,775,807 B2
(45) Date of Patent: Oct. 27, 2026

(54) EVENT-DRIVEN PERSONALIZED RECOMMENDATION SYSTEMS

(71) Applicant: TEACHERS INSURANCE AND ANNUITY ASSOCIATION OF AMERICA, New York, NY (US)

(72) Inventors: Sastry VSM Durvasula, Phoenix, AZ (US); Thasunda Brown Duckett, Greenwich, CT (US); Swatee Singh, Livingston, NJ (US); Rares Ioan Almasan, Paradise Valley, AZ (US)

(73) Assignee: TEACHERS INSURANCE AND ANNUITY ASSOCIATION OF AMERICA, New York, NY (US)

( * ) Notice: Subject to any disclaimer, the term of this patent is extended or adjusted under 35 U.S.C. 154(b) by 394 days.

(21) Appl. No.: 18/384,210

(22) Filed: Oct. 26, 2023

(65) Prior Publication Data

US 2025/0139378 A1 May 1, 2025

(51) Int. Cl.

*G06F 40/40* (2020.01)
*G06F 3/0484* (2022.01)
*G06F 16/28* (2019.01)

(52) U.S. Cl.

CPC ............ *G06F 40/40* (2020.01); *G06F 3/0484* (2013.01); *G06F 16/285* (2019.01)

(58) Field of Classification Search

None
See application file for complete search history.

(56) References Cited

U.S. PATENT DOCUMENTS

| | | | | | |
|---|---|---|---|---|---|
| 10,242,019 | B1 * | 3/2019 | Shan | G06N 7/01 | |
| 11,017,474 | B1 * | 5/2021 | Guerrero | G06F 3/0482 | |
| 2006/0074788 | A1 * | 4/2006 | Grizack | G06Q 40/02 | 705/35 |
| 2023/0267689 | A1 * | 8/2023 | Breitweiser | G06Q 50/26 | 345/419 |
| 2025/0069049 | A1 * | 2/2025 | Kurani | G06Q 20/229 | |

* cited by examiner

*Primary Examiner* — Nafiz E Hoque
(74) *Attorney, Agent, or Firm* — MARSHALL, GERSTEIN & BORUN LLP

(57) ABSTRACT

A method for generating predictive and event-based action recommendations includes receiving, from at least one data source, input data representative of a user; classifying, using a first machine learning model, the input data based on one or more personas representative of user characteristics to generate classified input data; identifying, from the input data, at least one event associated with the user; and generating, based on the at least one event and the classified input data, a personalized recommendation for the user using one or more second machine learning models, wherein the personalized recommendation comprises a set of actions predicted to achieve the goal based on the impact on the goal caused by the at least one event.

20 Claims, 7 Drawing Sheets

EVENT-DRIVEN PERSONALIZED RECOMMENDATION SYSTEMS

TECHNICAL FIELD

The present disclosure generally relates to data management and processing systems, and more particularly, to event-driven personalized recommendation systems.

BACKGROUND

An enterprise environment can include multiple devices communicably coupled by a private network owned and/or controlled by an enterprise (e.g., organization). An enterprise environment can include an on-premises subnetwork in which software is installed and executed on computers on the premises of the enterprise using the software.

SUMMARY

In one aspect, a computer-implemented method for generating predictive and event-based action recommendations is provided. The method may include: (i) receiving, by one or more processors and from at least one data source, input data representative of a user; (ii) classifying, by the one or more processors and using a first machine learning model, the input data based on one or more personas representative of user characteristics to generate classified input data, wherein the one or more personas include at least one user persona representative of the user; (iii) identifying, by the one or processors and from the input data, at least one event associated with the user, wherein the at least one event has an impact on a goal to be achieved by the user; and (iv) generating, by the one or more processors and based on the at least one event and the classified input data, a personalized recommendation for the user using one or more second machine learning models, wherein the personalized recommendation comprises a set of actions predicted to achieve the goal based on the impact on the goal caused by the at least one event.

In another aspect, a computing device configured to generate predictive and event-based action recommendations is provided. The computing device may include one or more processors and a non-transitory computer-readable medium coupled to the one or more processors and storing instructions thereon that, when executed by the one or more processors, cause the computing device to: (i) receive, from at least one data source, input data representative of a user; (ii) classify, using a first machine learning model, the input data based on one or more personas representative of user characteristics to generate classified input data, wherein the one or more personas include at least one user persona representative of the user; (iii) identify, from the input data, at least one event associated with the user, wherein the at least one event has an impact on a goal to be achieved by the user; and (iv) generate, based on the at least one event and the classified input data, a personalized recommendation for the user using one or more second machine learning models, wherein the personalized recommendation comprises a set of actions predicted to achieve the goal based on the impact on the goal caused by the at least one event.

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
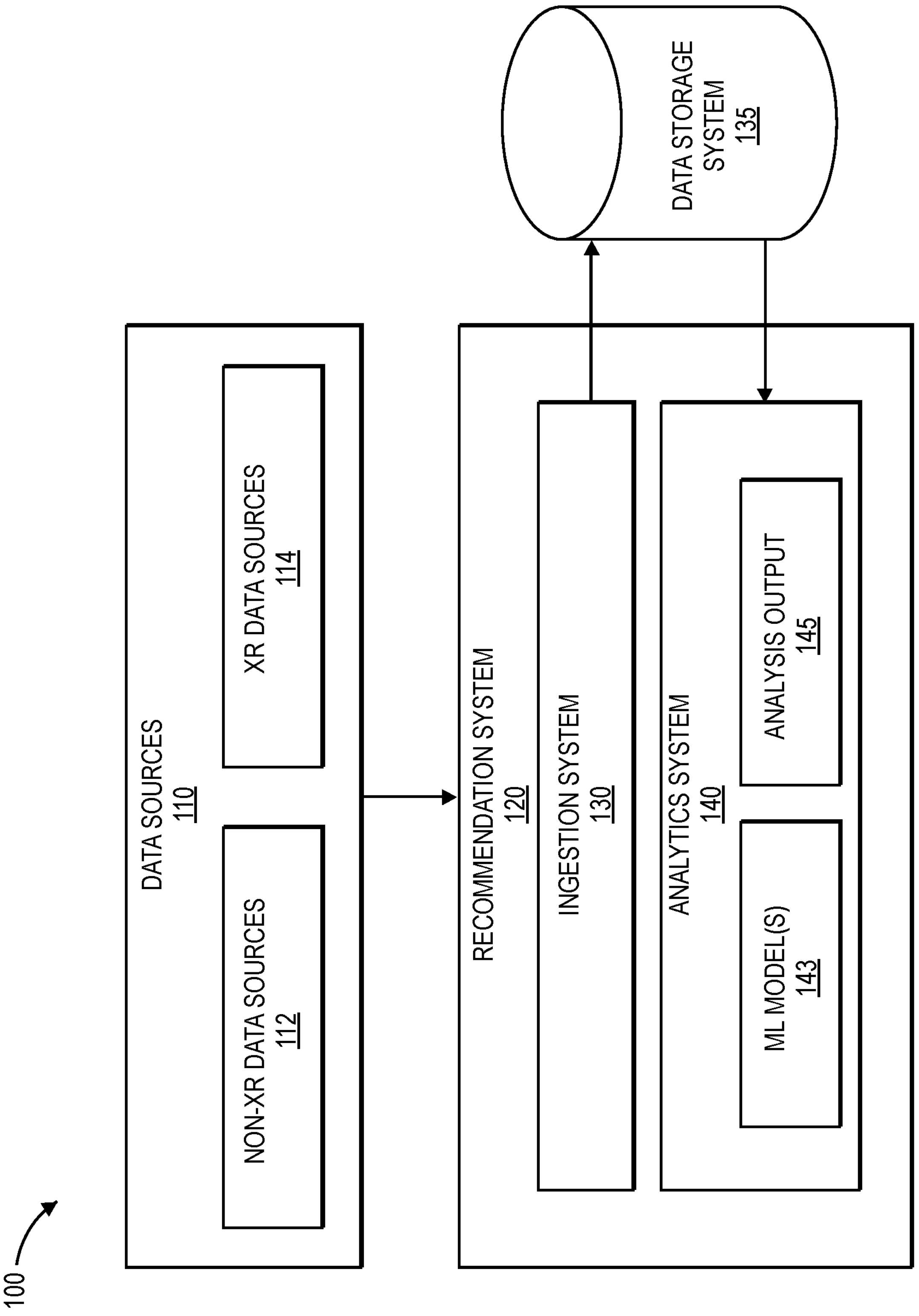
FIGS. 1A-2 are diagrams of example computer systems to generate event-driven personalized recommendations, in accordance with some implementations of the present disclosure.

Aspects of the present disclosure are directed to event-driven personalized recommendation systems. A computing system can include multiple devices communicatively coupled via a network. The network can include one or more of: a local area network (LAN) to connect devices within a limited region (e.g., a building), a wide area network (WAN) to connect devices across multiple regions (e.g., using multiple LANs), etc. For example, a computing system can be an enterprise environment overseen by an enterprise (e.g., organization). An enterprise environment can include multiple devices communicably coupled by a private network owned and/or controlled by an enterprise (e.g., organization). An enterprise environment can include an on-premises subnetwork in which software is installed and executed on computers on the premises of the enterprise using the software. Additionally or alternatively, an enterprise environment can include a remote subnetwork (e.g., cloud subnetwork) in which software is installed and executed on remote devices (e.g., server farm). An enterprise environment can be used to facilitate access to data and/or data analytics among devices of the private network.

Examples of devices of an enterprise environment can include client devices (e.g., user workstations), servers (e.g., web servers, email servers, high performance computing (HPC) servers, database servers and/or virtual private network (VPN) servers), etc. An enterprise can oversee a computing system that utilizes a variety of technology services in order to provide solutions and capabilities to users and clients. Examples of technology services include services that can implement and/or host technology services internally within a datacenter or other computing system (i.e., on-premises infrastructure). Additionally or alternatively, an enterprise can use remote services providers (e.g., cloud service providers) that implement and host technology services using remote infrastructure (e.g., remote servers). Examples of technology services include software as a service (SaaS), infrastructure as a service (IaaS), platform as a service (PaaS), etc. For example, enterprises can use third party vendors and/or suppliers to provide technology services. Enterprises may also own or partially own subsidiaries or affiliates who provide technology services.

Some enterprises can leverage user data to generate personalized products or solutions for users. The greater the amount of data available to an enterprise, the more personalized the product or solution that can be delivered. As a result, the ability to effectively manage and consume data has become essential for the success of an enterprise. The rapid growth of data, available from an ever-expanding number of touchpoints, however, has created challenges for enterprises in managing, accessing, and consuming the data.

By way of example, an enterprise may provide users with an advisory service. An advisory service can provide a user with guidance on how the user may be able to achieve a goal, such as a financial goal (e.g., maximize savings or minimize savings). The guidance can include products the user can use and/or actions that the user can take to help achieve the goal (e.g., maximize savings, minimize retirement spending). One example of such an advisory service is a retirement planning service.

An advisory service can be implemented using a recommendation system to provide personalized recommendations for the user. For example, a recommendation system can consider different features or attributes of a user. Based on such features and/or attributes, the recommendation system may generate a personalized recommendation as to what products the recommendation system recommends that the user should utilize and/or actions that the recommendation system recommends that the user should take to achieve a future goal (e.g., retirement goal). The recommendation system, for example, may provide different recommendations to the user based on basic demographic attributes of the user (e.g., age, ethnicity, etc.) and/or basic financial attributes of the user (e.g., annual income, total net worth, credit worthiness, etc.).

In some cases, the recommendation system may obtain and/or generate a profile of a user by analyzing data from different data sources. However, such data may be stored and/or retrieved in a number of different forms (e.g., varying in terms of data formatting, data quality, ease of use, etc.). Accessing and consuming data from different sources and/or in different forms in a timely manner may present a significant technical challenge to generating user profiles and, subsequently, recommendations based on the user profiles. Therefore, conventional recommendation systems primarily consider historical data from a limited number of sources, each source having varying degrees of quality. As such, conventional techniques generate a relatively limited profile of a user and, consequently, relatively generic recommendations for the user that are not appropriately or sufficiently tailored to the user. Furthermore, some conventional systems utilize simplistic rule-based models and algorithms to make a recommendation for a user based on a profile of the user. For example, such a conventional system may broadly sort recommendations based on a particular characteristic according to a simplistic ruleset (e.g., a single user in the 20-40 year age bracket and making more than $100,000 annually should invest 25% of each paycheck). As such, some conventional systems may be unable to generate personalized recommendations that are appropriately and sufficiently tailored to particular users. Some conventional systems may be further limited in that the systems are unable to account for broader trends exhibited by a cohort to which the user is determined to belong (e.g., generational trends). Some conventional systems may also be unable to generate updated personalized recommendations for users that can account for user changes, such as events in the life of a user that may have an impact on a goal (e.g., retirement goal) and, thus, a personalized recommendation for achieving the goal.

Aspects of the present disclosure address the above and other deficiencies by implementing event-driven personalized recommendation systems. An event-driven predictive recommendation system may be included within a computing system, which can be managed by an enterprise. For example, the event-driven personalized recommendation system can be implemented using a system driven by artificial intelligence and/or machine learning techniques as described herein.

Depending on the implementation, an event-driven personalized recommendation system can identify, using at least one machine learning (ML) model, at least one event predicted to impact at least one goal (i.e., target) set for a user. For example, a goal can be a future goal of the user. Illustratively, the goal can be a retirement goal. An event can be a past event that occurred in the user's past, a present event that is occurring in the user's present, or a future event that will occur or is predicted to occur in the user's future. Examples of events include birthdays, employment events (e.g., past, present and/or future employment or changes in employment), marriages or civil unions, divorces, birth of a child, deaths within the user's family, target retirement age, expenditures (e.g., home purchases, college tuition for the user or user's child(ren), engagement rings, weddings, vacations, funerals, and/or other expenditures or), etc.

An event can be identified by ingesting data collected from various data sources. For example, the data collected from various data sources can include raw data, and the data ingestion processes the data such that the data is suitably formatted (e.g., via a ML model). Depending on the implementation, a data source can be an extended reality (XR) data source or a non-XR data source. In some implementations, the XR data source is or is associated with an XR system operated by a user. Examples of XR systems described herein include virtual reality (VR) systems, augmented reality (AR) systems, and mixed reality (MR) systems, though it will be understood that other such XR systems and/or combinations of such are also anticipated. In some implementations, a data source is a non-XR data source from which non-XR data pertaining to a user can be collected. Examples of non-XR data sources include websites, applications, client devices (e.g., laptops, mobile devices, desktops and/or tablets), Internet of Things (IoT) devices, servers, etc. Further details regarding data sources and data ingestion will be described in further detail herein.

In some implementations, an event is reported by the user manually via a user interface provided by the event-driven personalized recommendation system. In some implementations, the event-driven personalized recommendation system automatically identifies, using at least one ML model, an event from at least one data source associated with the user. For example, the event-driven personalized recommendation system can use at least one ML model trained to identify, from user data obtained from the at least one data source, an event using pattern recognition techniques. The user can verify that an event identified by the event-driven personalized recommendation system is legitimate. For example, if the event is not legitimate, then the user can indicate the same and remove the event. In some implementations, the event-driven personalized recommendation system can train the ML model using the results and/or verification from the user. In implementations in which the user does not directly provide the event to the event-driven personalized recommendation system may prompt the user for and receive permission prior to retrieving data to detect and/or identify the event.

In response to identifying the at least one event, the event-driven personalized recommendation system can generate, using at least one ML model, a personalized recommendation to achieve a goal based on the at least one event. The personalized recommendation can include at least one action that can be taken to achieve the goal. For example, the at least ML model can predict at least one optimal action that can be taken to achieve the goal that takes into account the impact of the at least one event on the goal. In some implementations, the recommended action does not directly achieve the goal, but instead furthers progress of the user towards the goal and/or indirectly allows the user to further progress toward the goal.

Illustratively, the analytics system can generate personalized recommendations related to financial planning to achieve a financial goal. Examples of financial goals include retirement goals, higher education savings goals, etc. For example, the event-driven personalized recommendation system can identify opportunities for savings that would otherwise be spent on non-essential items. As another example, the event-driven personalized recommendation system can identify events that can impact the financial goal and generate a personalized recommendation to achieve the financial goal (e.g., actions that can be taken to achieve the financial goal).

For example, a user may stop purchasing items or services that may no longer be needed or useful (e.g., additional groceries after a child has moved out, subscriptions for services such as streaming services that are no longer utilized, alcohol after becoming pregnant, etc.), which results in available funds. The user may decide to reallocate the available funds to make other purchases, even if the user's other expenses have remained substantially unchanged. Left unprompted, the user may ignore the option of reallocating these available funds to at least one financial account (e.g., tax-advantaged retirement accounts, tax-advantaged education savings accounts, brokerage accounts, deposit accounts and/or other accounts), which can impact the ability of the user to achieve at least one financial goal.

The event-driven personalized recommendation system can address such a problem by using the at least one ML model to predict the impact of reallocating these available funds to the at least one financial account to achieve at least one financial goal. The event-driven personalized recommendation system can generate and/or present, via the user interface, an illustration of the predicted impact of reallocating the newly available funds to the at least one financial account as the account relates to the at least one financial goal. The event-driven personalized recommendation system can further generate, using the at least one ML model in response to detecting an event that generates available funds, a personalized recommendation for the user that predicts an optimal or preferred reallocation of the available funds to the at least one financial account to achieve the at least one financial goal. The personalized recommendation can utilize the input data representative of the user. In some implementations, the user manually reallocates the available funds in accordance with the personalized recommendation. In further implementations, the event-driven personalized recommendation system automatically reallocates the available funds to the at least one financial account (e.g., responsive to prompting the user for and receiving permission). For example, the user can link the at least one financial account to the event-driven personalized recommendation system and grant permission to the event-driven personalized recommendation system to reallocate the available funds to the at least one financial account in accordance with the personalized recommendation. Further details regarding event-driven personalized recommendation systems, including event identification and personalized recommendation generation, will be described below with reference to FIGS. 1A-6.

Advantages of the present disclosure include, but are not limited to, improved recommendation system performance. For example, implementations described herein can enable the creation of customized and personalized recommendations (e.g., plans) that provide more relevant information to users. As another example, implementations described herein can improve the quality of personalized recommendations for a user by identifying impactful events from data derived from both non-XR and XR data sources. As yet another example, implementations described herein can continuously adjust personalized recommendations for a user by identifying events in real-time or near real-time. Accordingly, implementations described herein can be used to ensure that the personalized recommendations generated for a user remain relevant and up-to-date, even as changes are occurring the life of the user.

FIG. 1A illustrates an example computing system ("system") 100 for implementing event-driven predictive modeling and recommendations, in accordance with at least one embodiment. In some implementations, system 100 is managed by an enterprise. System 100 can include a set of data sources 110 that provide user data related to at least one user. Examples of user data include health and wellness data, financial data, demographic data, and miscellaneous data. Examples of health and wellness data include activity data, heart rate data, blood pressure data, pulse data, oximeter data, etc. Examples of financial data include spending pattern data, economic indicator data, market trend data, income data, expense data, savings rate data, investment performance data, investment allocation data, retirement plan contribution data, retirement account balance data, entitlement benefit data (e.g., Social Security and/or defined benefit plan), investment return data, healthcare cost data, withdrawal strategy data, tax rate data, housing cost data, etc. Examples of miscellaneous data include travel or vacation data, regulatory data, etc.

Data sources 110 can include physical devices, software applications, data resources, etc. that may provide data or access thereto. Data sources 110, for example, may include server devices (e.g., web servers, database servers, file servers, on-premise or in the cloud, etc.), client devices (e.g., laptop computers, desktop computers, cell phones, tablets, wearables, or other devices), Internet of Things (IoT) devices, or other devices; websites, web applications, mobile applications (e.g., running on a client device), enterprise applications, or other applications; file stores, file repositories, or databases; or other such data resources.

Data sources 110 may provide data (or access to data resources) through one or more outwardly facing interfaces (e.g., exposed to a private intranet, the public Internet, a cellular data network, a satellite data network, or other data network). Data sources 110, for example, may provide data (or access to data resources) via software applications or services running on the data source 110 or on a device associated with the data sources 110 (e.g., servers, mobile devices, IoT devices, etc.). A particular data source of data sources 110 (or device associated therewith), for example, may be running a server that a client (e.g., a client application running on the event-driven predictive modeling and recommendation system 100) may be able to communicate with using a suitable communication protocol. Data sources 110, for example, can include a website or web application hosted on a web server (e.g., an HTTP, HTTPS, or FTP server) that a client may communicate with using a suitable communication protocol, such as the Hypertext Transfer Protocol (HTTP), Hypertext Transfer Protocol Secure (HTTPS), or File Transfer Protocol (FTP). A client may send a request to the web server, which may process the request and send a response (e.g., containing the data of interest) back to the client.

In some cases, a data source 110 may provide data (or access to data resources) via a web service or application programming interface (API), including, for example, a simple object access protocol (SOAP), a representational state transfer (REST or RESTful), an HTTP, a WebSocket, or another web service or API. By way of example, data sources 110 may include database resources (e.g., a relational or non-relational database, such as a SQL or NoSQL database) that may be accessed through a database service or API of the server hosting the database (e.g., a Java database connectivity (JDBC) interface, an open database connectivity (ODBC) interface, an object linking and embedding database (OLE or OLEDB) interface, an ADO.NET interface, or another database interface).

For example, data sources 110 can include a set of non-XR data sources 112 that are sources of non-XR data for the user. Examples of non-XR data that can be obtained from non-XR data sources include data obtained from social media channels, data obtained from financial websites, data obtained from email accounts, data obtained from online surveys, data obtained from travel or vacation websites, health and wellness data, etc. Additionally or alternatively, the set of data sources 110 can include the set of XR data sources 114 that are sources of XR data for the user. For example, the set of XR data sources 140 can include at least one XR system, which can include at least one of: a VR system, an AR system, an MR system, etc. XR data for a user can be obtained through an XR system operated by the user. For example, in the case of a VR system, the VR system can enable access to a virtual environment that can include one or more virtual worlds that provide an immersive virtual experience for users. More specifically, each virtual world can be a 3D virtual space accessible to the user, where the user can interact with other users and with digital objects in the 3D virtual space. The user can create a virtual avatar that represents the user within a virtual world. Once inside a virtual environment, a user can perform various different types of activities, such as exploring the virtual environment, socializing with other users who are currently present within the virtual environment, participating in games and activities supported by the virtual environment, buying and selling virtual goods within a virtual marketplace supported by the virtual environment, etc. A virtual environment can be generated and maintained using a combination of technologies, such as ML, blockchain, metaverse techniques, etc. Depending on the implementation, such technologies can enable the creation and storage of large amounts of data that can be used to populate the virtual worlds with virtual content, such as virtual objects, virtual avatars, virtual buildings, etc. For example, XR data can be collected from virtual interactions by the user in the virtual world, such as via interactions during virtual events, within virtual communities or marketplaces, etc.

Similarly, an AR system may project an augmented environment into the real world by streaming or otherwise providing a feed of the surrounding real environment to the user while generating an overlay consisting of overlapping virtual items, avatars, locations, etc. Similarly to the virtual environment, the augmented environment may allow for similar activities as in the virtual environment, such as exploring the augmented environment, socializing with other users who are currently appearing within the augmented environment, participating in games and activities supported by the augmented environment, buying and selling virtual goods within a virtual marketplace supported by the augmented environment, etc., and may therefore provide similar XR data as the VR system. Moreover, an MR system may project a mix of the augmented and virtual environments, allowing a user to swap between the two and/or melding the two to provide a preferred environment to the user. As such, an MR system may provide similar XR data as the VR and AR systems described above. Therefore, it will be understood that the term "virtual world" may equally apply to any environment generated by any such XR system as described herein unless specified to the contrary.

Accordingly, XR data can be used to identify user preferences, behaviors, social connections, etc. in the virtual world. For example, with reference to FIG. 1B, a set of non-XR data sources 112 can include at least one of: website 150, application 152, client device 154 (e.g., laptop, mobile device, a desktop and/or a tablet), IoT device 156 (e.g., wearable device), etc., and the set of XR data sources 114 can include at least one XR system 158. An example XR system 158 will be described below with reference to FIG. 2.

Referring back to FIG. 1A, data sources 110, for example, may provide objective and/or subjective information regarding users (e.g., reflecting the preferences, goals, values, social connections and interactions, physical well-being, financial well-being, and/or other attribute of a user) as well as general data regarding the world(s) with or in which the users may live or interact (e.g., reflecting societal, environmental, and/or economic conditions of the world(s)). Data sources 110, for instance, may include internal data sources of an enterprise operating system 100 as well as external data sources of third-party enterprises.

Data sources 110 may provide different types of data, including for example, text data, audio data, visual data (e.g., images, video, animation), map data, graph data, or other types of data. In some cases, data sources 110 may also provide metadata that may describe other data provided by the data source 110. The data provided by a data source of data sources 110 may be structured data, unstructured data, or semi-structured data. Structured data may be data that is organized in a known manner, for example, according to a prescribed data model. A data model may define an organization of data elements, how they relate to one another, and/or their correspondence to properties of real-world entities. A data model, for instance, may specify that a data element representing a user is to be composed of a number of other elements representing different features or attributes that may characterize the user (e.g., demographic attributes, financial attributes, preference attributes, or other relevant attributes of the user). Structured data, for instance, may be data that is organized according to a relational model, such as data stored in a relational database (e.g., as a series of records comprising a defined set of fields or elements). Unstructured data (or unstructured information) may be data or information that does not conform to a pre-defined data model and/or is not organized in a pre-defined manner (e.g., free form text). Semi-structured data may be data that may not conform to a particular organizational structure (e.g., a tabular structure of data models associated with relational databases or other forms of data tables), but nonetheless contains markers (e.g., tags, labels, or the like) that separate semantic elements within the data and establish a hierarchy within the data (e.g., of records and fields).

Data sources 110 may include data sources associated with a user (or group of users) as well as general data sources that may not be associated with a particular user (or group of users). Data sources 110 associated with a user may be data sources 110 that provide data (or information) regarding a user and/or the life/lifestyle of the user. The data provided by data sources 110 may collectively or individually help to provide a complete or partial picture of a user and/or a user life/lifestyle. The data collected from data sources 110 may collectively or individually provide a picture of the user and the user life/lifestyle across time (e.g., at different points or stages in during the user life). Data sources 110 associated with a user, for example, may provide data reflecting the preferences, goals, values, social connections and interactions, physical well-being, financial well-being, and/or other attribute of a user or other attribute of their life.

Data sources 110 associated with a user may include data sources associated with a virtual and/or real-world presence of a user, providing, for example, data regarding the interactions of the user in the real-world and/or one or more virtual world(s). Data sources 110 associated with a user, for example, may include data sources of third-party enterprises or organizations with which a user may interact (e.g., third-party websites, applications, or services maintained and/or provided by such enterprises or organizations). Similarly, the data sources 110 associated with a user may include data sources associated with virtual world(s) in which a user may interact (e.g., through websites or applications associated with such virtual worlds). The virtual world(s) may include, for instance, virtual events, virtual communities, virtual marketplaces, or the like. Data sources 110 associated with a user may provide various types of data, such as demographic data, personal financial data (e.g., income data, spending data, expense data, investment data, etc.), health and wellness data (e.g., hear rate data, pulse rate data, oximeter data, or other activity level data), social interaction data (e.g., from social media channels and/or email), travel or vacation data (e.g., from common carrier websites and/or booking platforms), or other real-world and/or virtual world data regarding the user.

Data sources 110 can include data sources that are not associated with a particular user (or group of users) that may provide general data, for example, regarding the real-world and/or virtual world(s) with or in which a user may interact. Data sources 110, for instance, may provide data regarding the societal, environmental, and/or economic conditions, or other relevant aspects, of the real-world and/or virtual world(s) in which the user may interact. Data sources 110 may include data sources of third-party enterprises or organizations (e.g., third-party websites, applications, or services maintained or provided by such enterprises or organizations), such as data sources of news and media outlets, governmental agencies, financial institutions, or the like. Data sources 110, for example, may provide data regarding public security markets, economic indicators, market trends, government censuses, government regulations, savings rates, income tax rates, geopolitical events, environmental or geological changes, etc.

In some implementations, data sources 110 include internal data sources. One example of an internal data source is an enterprise data source. Enterprise data sources may include data sources maintained by the organization operating system 100. The enterprise data sources may contain data that is generated, captured, and/or collected by the organization. The enterprise data sources, for example, may contain data regarding one or more users with whom the organization may have and/or have had a relationship. The enterprise data sources of a financial services organization, for example, may contain data regarding users that have used and/or currently use one or more services offered by the organization (e.g., banking, investing, retirement, and/or advisory services). The enterprise data sources, for instance, may contain basic personal information regarding the user, such as demographic information (e.g., age, ethnicity, etc.) and/or personal identification information (e.g., name, address, driver's license number, Social Security Number (SSN), etc.). The enterprise data sources may also contain information regarding the services of the organization that were or are being used by the user (e.g., account numbers, statements, transaction histories, or other records). In some cases, a user may have had a relationship with the organization over a period of time, and so the data contained in enterprise data sources may provide data regarding the users at various points in time (e.g., at various stages during the user life). The above example(s) are merely illustrative of the data that may be provided by enterprise data sources, and enterprise data sources may provide other types of data regarding a user.

The enterprise data sources may also contain information that a user provided to the organization when enlisting in the recommendation service. A user, for instance, may have been asked to fill out a form, a questionnaire, or an application (generically, form), in which the user may have been asked to provide basic personal information along with answers to one or more questions, the responses to which may be used by system 100 to provide personalized recommendations to the user. A user, for example, may have been asked to and provided details regarding a profession or occupation (e.g., nurse, professor, engineer, etc.), financial situation (e.g., annual income, total net worth, credit worthiness, etc.), marital and/or family status, or the like. The user may have also been asked to and provided details regarding future goals and/or aspirations, for example, planned educational pursuits (e.g., plans to attend a college or trade school, or pursue a graduate degree), career ambitions (e.g., desire to change careers), expected retirement age (e.g., 50 years of age, 65 years of age, etc.), desired retirement location, or the like. In some cases, the user may have also been asked to and provided details regarding interests (e.g., hobbies, routine activities, etc.), preferences (e.g., likes and/or dislikes, relative preferences, etc.) including communication preferences (e.g., mail, telephone, electronic mail (or e-mail), text message, social media message, etc.), or other relevant information. In some cases, the information requested and/or questions included in an enrollment form may be generated based on the different models used by system 100. In this way, the responses provided by the user can help drive the models to produce more personalized recommendations. The above example(s) are merely illustrative, and the organization may have solicited and collected responses regarding any number of relevant dimensions of the user, which the enterprise data sources may have captured and be able to provide.

In some implementations, data sources 110 include external data sources, such as user data sources and general data sources. User data sources may include data sources of third-party enterprises or organizations that may capture and/or collect data regarding a user. A user may choose to and/or authorize system 100 to access user data sources (e.g., when enlisting in the personalized recommendation service). The user data sources, for example, may include data platforms associated with websites, applications, and/or services of third-party enterprises or organizations with which a user may interact. The user data sources, for example, may include data platforms of financial services providers with whom the user has a relationship (e.g., of banking, credit card, insurance, retirement, or brokerage service providers). Financial services providers, for example, may collect financial information regarding a user (or personal financial data), including income, spending, expenses, investment accounts (e.g., balance, contributions, withdrawals, transactions, performance, etc.), entitlement benefits (e.g., Social Security, pension, and/or other defined benefit plans), or other personal financial data. As another example, user data sources may include data platforms associated with health and/or wellness service providers with whom the user has a relationship (e.g., doctors, hospitals, insurance providers, wearable devices platforms, etc.). Health and/or wellness service providers, for example, may collect medical record data (e.g., patient records, health insurance records, etc.), activity data (e.g., heart rate data, pulse rate data, oximeter data, etc.), or other health and wellness data. As yet another example, user data sources may include data platforms associated with social media channels on which the user may interact. The social media channel platforms may provide conversational data (e.g., between the user and others), reaction data (e.g., likes, dislikes, or other reactions to a message, picture, post, etc.), or other interaction data. The above example(s) are merely illustrative of the data that may be provided by user data sources, and user data sources may provide other types of data regarding a user.

In further implementations, data sources 110 can additionally include data sources of third-party enterprises or organizations that may generate, capture, and/or collect data regarding societal and/or environmental conditions in different countries across the world or the world as a whole. Data sources 110 can include publicly or privately accessible data sources of third-party enterprises or organizations. Data sources 110, for example, may include data platforms associated with websites, applications, and/or services of news and media outlets, financial institutions, or governmental agencies. These data platforms can store and/or host data regarding public security markets, economic indicators, market trends, healthcare costs, government censuses, government regulations, savings rates, income tax rates, geopolitical events, environmental or geological changes, or other societal and/or environmental data. The above example(s) are merely illustrative and data sources 110 may provide other types of data.

System 100 can further include recommendation system 120. Recommendation system 120 can generate an event-driven personalized recommendation for a user based on user data for the user obtained from data sources 110. In some implementations, recommendation system 120 generates event-driven personalized recommendations as to products or services offered by an enterprise that a user may want to use, actions the user may take, and/or behaviors that the user may change or engage in to better position the user and/or other individuals associated with the user (e.g., a child, spouse, sibling, parent, etc.) for retirement and help the user to meet the user-provided retirement goals (e.g., a minimum amount of retirement savings, a target retirement age, etc.).

In some implementations, recommendation system 120 includes ingestion system 130 to ingest data from various different data sources 110. Ingestion refers to the collection and importation of data from set of data sources 110 for storage into a data storage system (e.g., database), such as data storage system 135. Ingestion system 130 can employ a set of data ingestion tools to perform data ingestion. For example, the set of data ingestion tools can include one or more APIs. In some implementations, ingestion system 130 ingests data regarding users with whom the enterprise may have and/or have had an existing relationship (e.g., from one or more internal data sources), including for example, demographic and/or personal identification information for each user as well as information regarding the services of the organization that were and/or are being used by each user. Ingestion system 130 may also ingest data regarding information that existing users, as well as new users, may have provided to the enterprise when registering to use system 100.

Depending on the implementation, data ingestion can involve a number of stages, which can include extraction, transformation, and loading ("ETL"). During the extraction stage, user data identified from a set of data sources pertaining to the user is extracted. The user data may be extracted from various different data sources (e.g., non-XR and/or XR) and/or in various different data formats or types. Examples of data formats include structured data, semi-structured data, or unstructured data. Examples of data types include API feeds, database queries, Portable Document Format (PDF) files, word processing document files, table-structured format files (e.g., comma-separated value (CSV) files), read-only API access to technology assets and data sources such as a public cloud infrastructure, etc.

In some implementations, extracting data from set of data sources 110 includes performing data digitization. Data digitization refers to a process of converting analog information included in a non-digital medium (e.g., physical documents, physical photographs, audio recordings and/or video recordings) into a digital format from which data can be extracted. For example, a digital format can be an electronic document, an image file, an audio file, a video file, etc.

Figure 1B:
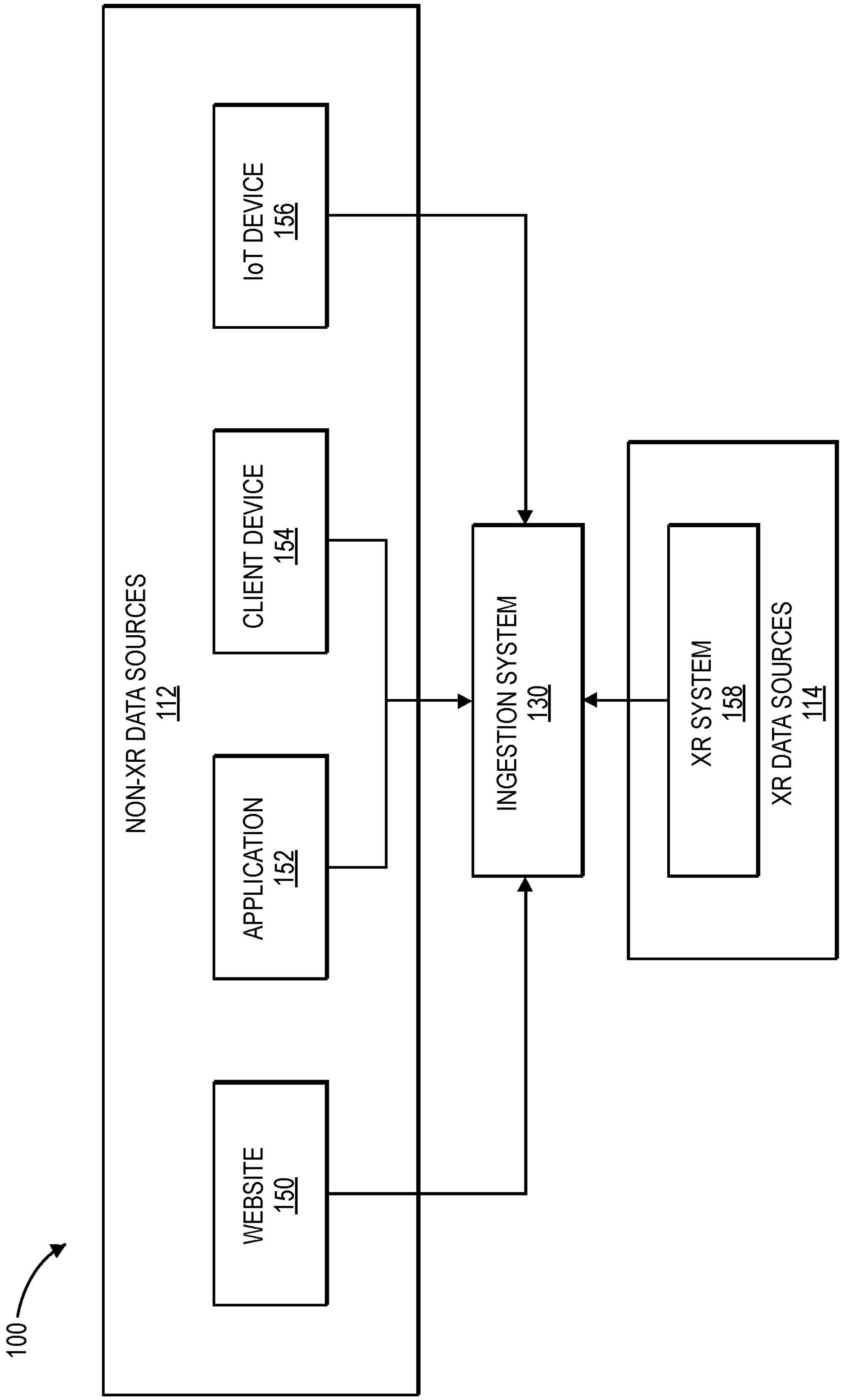

Data can be extracted from website 150 and/or application 152 of FIG. 1B by using a scraping tool (e.g., program or script). A scraping tool can be used to access and extract data from source code. For example, data can be extracted from website 150 and/or application 152 using an API of website 150 and/or application 152, and/or by using a special purpose tool or programming language.

Data can be extracted from IoT device 156 of FIG. 1B by using a suitable IoT communication protocol. One example of an IoT communication protocol is Message Queuing Telemetry Transport (MQTT). MQTT is a messaging protocol that can be used to transmit messages from IoT device 156 to an external computing device (e.g., recommendation system 120) (and vice versa). MQTT operates using a publish/subscribe model, in which messages are published to a topic, and any device that has subscribed to that topic will receive the message. Another example of an IoT communication protocol is Constrained Application Protocol (CoAP). CoAP is a messaging protocol designed for use with constrained IoT devices, which are IoT devices that are capable of operating under resource constraints (e.g., processing, memory, energy and/or network). Constrained IoT devices can be configured to perform specific tasks with minimal resource consumption. For example, a constrained IoT device can be a small, embedded device (e.g., a sensor and/or actuator), which can be used in industries and/or products such as smart appliances, wearable technology, and industrial automation. CoAP operates using a client/server model, in which a client can send a request to a server, and the server will send a response back. MQTT can also be used with constrained IoT devices. Both MQTT and CoAP can be used to enable communication between IoT device 156 and recommendation system 120 in environments with limited bandwidth and limited network connectivity (e.g., unreliable network connections).

During the transformation stage, the extracted data is transformed to generate transformed data. The transformed data has a data format suitable for use by the recommendation system to generate a personalized recommendation for a user. For example, the transformed data can have a format suitable for use by an ML model trained to generate a personalized recommendation for a user based on the transformed data. Transforming data can include performing data curation, data integration, data cleaning, data duplication, data de-duplication, data validation, data normalization and/or or data enrichment. In some implementations, transforming the extracted data includes generating an ML model using the extracted data. For example, generating the ML model can include training an ML model based on the extracted data or updating an ML model (e.g., retraining a previously trained ML model) based on the extracted data. Further details regarding ML models are described below.

In some implementations, transforming the extracted data includes performing data codification. Data codification refers to a process of assigning codes (e.g., symbols) to data that represent respective data attributes, which can be used to organize (e.g., categorize) the data and/or transform the data for further analysis. Codes can be numerical, alphabetical, and/or alphanumerical. Mappings between codes and the respective data attributes that the codes represent can be maintained within a codebook.

In some implementations, transforming the extracted data includes performing natural language processing (NLP). NLP refers to techniques that can enable computers to understand and/or generate human-interpretable language. Performing NLP can include transforming raw text data into processed text data having a data format suitable for analysis, identifying meaning and intent from the processed text data (i.e., language understanding), generating natural language text from non-language data, such as data from sensors, databases, etc. Text preprocessing can include at least one of tokenization, part-of-speech tagging, named entity recognition, etc. Language understanding can include at least one of parsing, sentiment analysis, semantic reasoning, topic modeling, text classification, etc. Language generation can include at least one of text summarization, machine translation, etc.

The transformed data may also be curated for further processing by recommendation system 120, for example, by performing one or more operations to identify relevant data (e.g., with respect to a goal or objective for which a recommendation may be given), abstract the data (for instance, to groups of users (e.g., by generating and enriching representative personas)), organize the data (e.g., filter and/or segregate the data for training and/or performing inferencing using different models), and/or streamline the data (e.g., reduce a size or dimensionality of the data used for training and/or performing inferencing using particular models) for efficient use by recommendation system 120.

During the loading stage, the transformed data is loaded into data storage system 135 (e.g., a database). Data storage system 135 can be on-premises storage, remote storage (e.g., cloud storage), etc. For example, loading transformed data can include performing batch processing or real-time streaming. Batch processing is a type of data processing in which data is collected, processed, and analyzed in batches, typically at scheduled intervals. In the context of data ingestion, batch processing can include temporarily storing transformed data in a buffer or staging area, and then processing the transformed data in batches at predetermined times. In contrast to batch processing, real-time streaming in a type of data processing in which data is collected, processed, and analyzed in real-time or near real-time as the data is generated. In the context of data ingestion, real-time streaming can be used in applications. Batch processing can be a cost-effective way to process large amounts of data while minimizing resource usage in some data processing applications. Real-time processing can utilize more resources than batch processing. However, real-time processing can provide benefits that outweigh the costs in some applications that would improve from real-time or near real-time data-driven insights, such as real-time or near real-time cybersecurity monitoring. In some implementations, data storage system 135 is a smart data storage system that ingests and processes raw data collected from data sources 110. To ensure privacy of personal information, ingested data representative of a user can be encrypted and/or transmitted using end-to-end encryption. Additionally, data storage system 135 can be a secure data storage system (e.g., secure data warehouse).

The recommendation system 120 can further include analytics system 140 that can analyze ingested data representative of a user to generate analysis output 145 including an event-driven personalized recommendation for the user. For example, the ingested data can be obtained at least from data storage system 135. The ingested data can include data ingested from XR and/or non-XR sources.

In some implementations, analytics system 140 generates a user profile for the user based on the ingested data. For example, analytics system 140 can use at least one ML model to identify and/or determine various features or attributes about the user from the ingested data. A user profile can include different demographic attributes, financial attributes, preference attributes, or other relevant attributes of the user, which may help to characterize the user, user behavior (e.g., financial behavior), and/or user needs (e.g., financial needs). Analytics system 140 can consider such different features or attributes to generate a personalized recommendation for the user. In some embodiments, system 100 may also consider a broader cohort to which the user may belong, which may help improve personalized recommendations generated by the recommendation system 120.

In some implementations, the input data representative of the user is analyzed in real time or near real-time to generate the personalized recommendation for the user. More specifically, analytics system 140 can use at least a ML model that is trained to generate the personalized recommendation for the user using the input data. In some implementations, analyzing the input data includes performing predictive modeling using the ML model.

Predictive modeling refers to using a ML model to make predictions about future events or trends based on input data.

For example, a ML model can be trained by associating input training data representative of respective users, to respective output recommendations determined to be optimal for the input training data. A ML model can be trained using a training dataset including historical data (e.g., labeled data and/or unlabeled data), with the goal of teaching the ML model to identify relationships between input data and output data corresponding to future events or trends. Thus, the at least one ML model can be trained to generate, for input data representative of a user, a recommendation that is predicted to be optimal for the user for the input data. Further details regarding training ML models are described herein below.

More specifically, analytics system 140 can use at least one ML model to identify at least one event within the life of a user that has an impact on a goal of the user. An event can be a past event that occurred in the user's past, a present event that is occurring in the user's present, or a future event that will occur or is predicted to occur in the user's future. Examples of events include personal events that are specific to the user, such as birthdays, employment events (e.g., past, present and/or future employment or changes in employment), marriages or civil unions, divorces, birth of a child, deaths within the user's family, target retirement age, expenditures (e.g., home purchases, college tuition for the user or user's child(ren), engagement rings, weddings, vacations, funerals, and/or other expenditures), etc. Other examples of events include impersonal events that are not specific to the user, such as world events. Such impersonal events can be identified from external data sources, such as websites (e.g., news websites). In some implementations, an event is reported by the user manually via a user interface provided by system 100. In some implementations, analytics system 140 automatically identifies, using at least one ML model, an event from at least one data source (e.g., internal data source or external data source). For example, analytics system 140 can use at least one ML model trained to identify, from user data obtained from a data source, an event using pattern recognition. For example, the ML model can be trained to identify events using at least one of supervised learning, unsupervised learning, semi-supervised learning, or reinforcement learning.

The at least one non-XR data source can include at least one user application (e.g., email account, calendar and/or social media account). The user can grant the system 100 permission to access the at least one user application (e.g., by linking the at least one user application to the event-driven personalized recommendation system). User data can include emails, calendar entries, social media posts, etc., from which the at least one ML model can recognize patterns that reflect respective events. As another example, the at least one data source can include an XR data source. Analytics system 140 can recognize patterns from user data obtained from the XR data source.

In some implementations, an event identified by analytics system 140 is stored in at least one data storage system 135. For example, the at least one data storage system 135 can include an event repository for securely storing and organizing events for a user identified by analytics system 140. The event repository can provide a comprehensive view of the events identified for the user and can allow for retrieval of event information by users via a user interface (e.g., secure user interface).

In response to identifying the at least one event, the analytics system 140 can generate, using at least one ML model, a personalized recommendation to achieve a goal based on the at least one event. The personalized recommendation can include at least one action that can be taken to achieve the goal. For example, the at least ML model can predict at least one recommended action that can be taken to achieve the goal, where the action takes into account the impact of the at least one event on the goal.

Illustratively, analytics system 140 can generate personalized recommendations related to financial planning to achieve a financial goal. Examples of financial goals include retirement goals, higher education savings goals, etc. For example, the event-driven personalized recommendation system can identify opportunities for savings that would otherwise be spent on non-essential items. As another example, analytics system 140 can identify events that can impact the financial goal and generate a personalized recommendation to achieve the financial goal (e.g., actions that can be taken to achieve the financial goal).

To illustrate, a user may stop purchasing items that may no longer be needed (e.g., diapers after a child is toilet trained or daycare expenses after a child is old enough to attend kindergarten). This results in available funds. The user may decide to reallocate these available funds to make other purchases, even if the user's other expenses have remained substantially unchanged. The user may be ignoring the option of reallocating these available funds to at least one financial account (e.g., tax-advantaged retirement accounts, tax-advantaged education savings accounts, brokerage accounts, deposit accounts and/or other accounts). Ignoring such options can impact the ability of the user to achieve at least one financial goal. Analytics system 140 can address this problem by using the at least one ML model to predict the impact of reallocating these available funds to the at least one financial account to achieve at least one financial goal. Analytics system 140 can present, via the user interface, an illustration of the predicted impact of reallocating these available funds to the at least one financial account as it relates to the at least one financial goal.

Analytics system 140 can further generate, using the at least one ML model in response to detecting an event that generates available funds, a personalized recommendation for the user that predicts a recommended reallocation of the available funds to the at least one financial account to achieve the at least one financial goal. The personalized recommendation can utilize the input data representative of the user. In some implementations, the user manually reallocates the available funds in accordance with the personalized recommendation. In some implementations, system 100 automatically reallocates the available funds to the at least one financial account. For example, the user can link the at least one financial account to system 100 and give system 100 permission to reallocate the available funds to the at least one financial account in accordance with the personalized recommendation.

Analytics system 140 can support various functionalities to improve the quality of the personalized recommendation generated for the user. In some implementations, analytics system 140 can identify an event that is predicted to reoccur. This information can be used to further refine the personalized recommendation.

In some implementations, analytics system 140 can enable the user to verify that an event identified by analytics system 140 is legitimate. For example, if the event is not legitimate, then the user can indicate the same and remove the event. By enabling the user to verify events, the analytics system 140 can improve the quality of the personalized recommendation generated for the user.

In some implementations, analytics system 140 determines whether a misalignment exists between multiple events identified from the user data using the at least one ML model. For example, determining whether a misalignment exists between multiple events identified from the user data using the at least one ML model includes determining whether any inconsistencies and/or conflicts exists between at least two events. In some implementations, multiple events include different versions of a same event type (e.g., a previous version of the event, a current version of the event and/or a future version of the event). If a misalignment exists between multiple events identified from the user data using the at least one ML model, then analytics system 140 can perform a remedial action to resolve the misalignment (e.g., by addressing an inconsistency and/or conflict). Otherwise, analytics system 140 determines that the multiple events are aligned, and no remedial action needs to be taken.

In some implementations, analytics system 140 enables forecasting and prediction of risk associated with an event and/or generates a risk mitigation response to reduce the risk. Depending on the implementation, the risk associated with the event may be a risk of financial loss, a risk of delay for a goal (e.g., a goal decided by a user as described herein) a risk of a negative event occurring (e.g., an event likely to cause financial loss, delay of a goal, etc.), and/or any other such risk as described herein.

In some implementations, analytics system 140 uses a generative model (e.g., large language model (LLM)) trained on a corpus of event data to stop hallucination propagation. For example, by training the generative model on a large corpus of event data, hallucinations may be less likely and/or may be easier for a module of the analytics system 140 (e.g., as discussed below with regard to FIG. 3) to detect and/or correct.

In some implementations, analytics system 140 can detect an event having a low confidence level and sends an alert to the user of the event having a low confidence level. This can allow the user to determine whether to approve of the event. For example, the analytics system 140 may determine a confidence level associated with a predicted event and prompt a user to confirm the existence of the event responsive to the confidence level being below a predetermined threshold. Similarly, the analytics system 140 may detect an event from input data and may prompt a user to confirm details of the event where one or more details of the event have a confidence level below a predetermined threshold.

Figure 2:
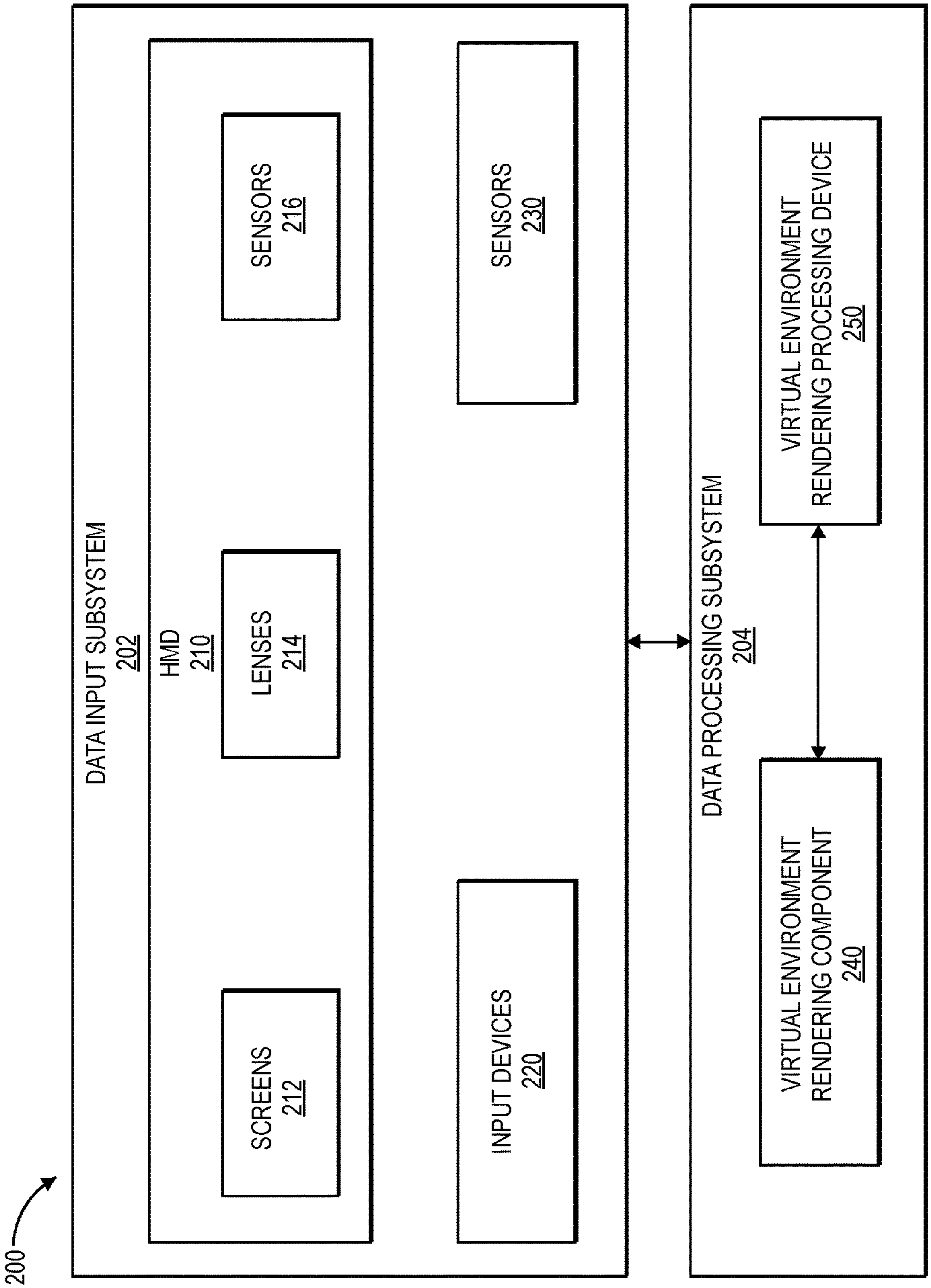

FIG. 2 is a diagram of an XR system ("system") 200, in accordance with some implementations. The system 200 can include data input subsystem 202 and data processing subsystem 204. The data input subsystem 202 can include a set of data collection components that can be used to obtain data from a user (e.g., user motion data, user input data), and the data processing subsystem 204 can include a set of data processing components that can be used to process the data obtained from the user to cause actions to be performed within a virtual environment.

For example, data input subsystem 202 can include head-mounted display (HMD) 210. Examples of head-mounted displays include headsets, glasses, etc. The HMD can include set of screens 212 (e.g., high-resolution display screens), set of lenses 214, and set of sensors 216. Set of screens 210 can include multiple screens (e.g., a pair of screens) that can collectively generate a 3D visual effect for the user. A set of lenses 214 can include lenses to help focus images and adjust for user interpupillary distance (i.e., the distance between the centers of the user's eyes). A set of sensors 216 can be used to track the position and/or movement of HMD 210 and/or the user's head. Examples of sensors of the set of sensors 216 can include accelerometers, gyroscopes, etc.

User subsystem 202 can further include a set of input devices 220 that can allow the user to interact with the virtual environment. For example, the set of input devices 220 can include at least one of: one or more hand controllers, one or more joysticks, etc. The data input subsystem 202 can further include the set of sensors 230. More specifically, the set of sensors 230 can include a set of motion tracking sensors to detect user movements and convert user movements into responses within the virtual environment. For example, the set of sensors 230 can include one or more cameras to track the position and/or movement of the HMD and/or the set of input devices 220, one or more inertial sensors to detect user movement, etc. The set of sensors 230 can be placed within a room to optimize movement detection.

The data processing subsystem 204 can include a virtual environment rendering component 240. The virtual environment rendering component 240 can be used to render a virtual environment that is realistic and immersive for the user for an XR application (e.g., VR, AR and/or MR). Data processing subsystem 204 can utilize a high level of graphics processing power to render the virtual environment in real-time or near real-time. For example, the data processing subsystem 204 can use a set of virtual environment rendering devices 250 to render the virtual environment in real-time or near real-time. The set of virtual environment rendering processing devices 250 can include hardware components, such as specialized graphics cards, high-performance processing units (e.g., central processing units (CPUs) and/or graphics processing units (GPUs), and/or other hardware components. Further details regarding XR system 200 are described above with reference to FIGS. 1A-1B and will be described in further detail below with reference to FIGS. 3-6.

Figure 3:
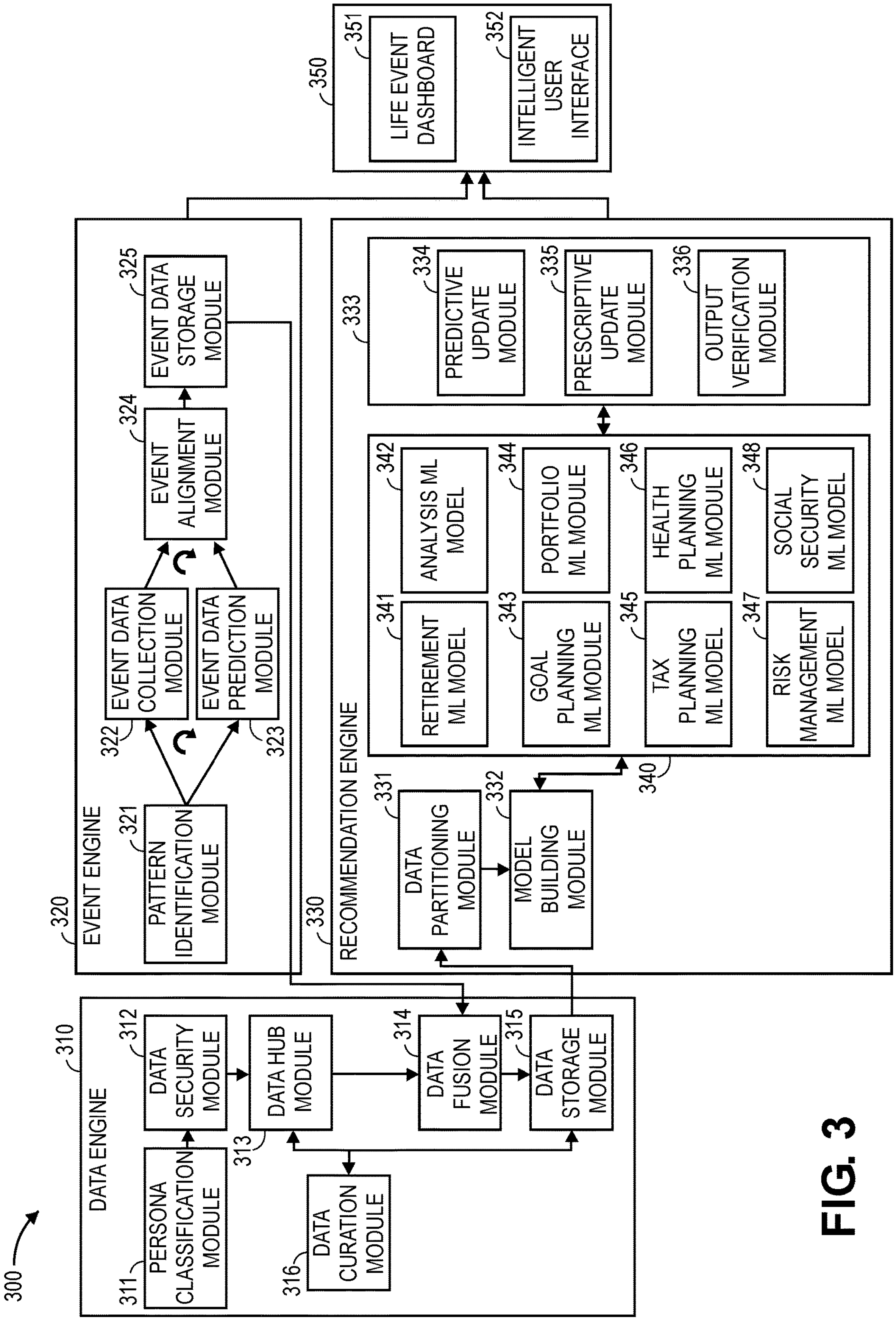
FIG. 3 is a diagram of an example computer system for generating event-driven personalized recommendations by retrieving input data, determining events in a user lifetime, generating recommendations, and displaying the recommendations to a user via a dashboard.

FIG. 3 is a block diagram of an example system 300 to implement methods for generating event-based personalized recommendations, in accordance with some implementations of the present disclosure. Depending on the implementation, the system 300 may include a data engine 310, an event engine 320, a recommendation engine 330, and/or a dashboard engine 350. Depending on the implementation, various components of the system 300 may include one or more components of computing system 100 of FIG. 1A. For example, the recommendation engine 330 may be or include the recommendation system 120 of FIG. 1A. In further implementations, the system 300 may include additional, fewer, or alternative components as described with regard to FIG. 3, herein. As such, it will be understood that other configurations of the system 300 are possible.

In some implementations, the data engine 310 receives, retrieves, and/or otherwise gathers data regarding a user and/or relevant to determining and/or detecting goals, events, recommendations, etc. as described herein. Depending on the implementation, the data engine 310 may include a persona classification module 311, a data security module 312, a data hub module 313, a data fusion module 314, a data storage module 315, and a data curation module 316. Generally, the data engine 310 may be a robust and versatile system that employs AI and ML technologies to collect, protect, generate insights, maintain a knowledge hub for enhanced connectivity and communications, and merge and prepare data for storing in a secure data storage.

In some implementations, the persona classification module 311 receives input data (e.g., from a user, from one or more data sources, and/or as otherwise described herein) and classifies the data. In particular, the persona classification module 311 may utilize AI and ML technologies to collect and curate the input data, analyze the data for errors, and structure and classify it based on different personas. In further implementations, the persona classification module 311 collects data for one or multiple personas within the same environment, making the system 300 highly versatile.

In some implementations, the persona classification module 311 may classify the data based on one or more user characteristics associated with the data. For example, the persona classification module 311 may use career data, salary data, location data, age data, and/or other such data representative of demographic characteristics to generate and/or classify data into different personas.

In further implementations, the data security module 312 provides data encryption and communication tools to enhance security of stored and/or used data. For example, the data security module 312 may ensure that the data is secured by default, regardless of a data phase (e.g., whether in transit, in process, or at rest). In particular, the data security module 312 may ensure that all privacy and personal information is protected by encrypting and/or otherwise protecting the data. Moreover, the data security module may ensure that the data provided by the persona classification module is secured throughout the process. The data security module may then transmit the data to the data hub module 313. In some such implementations, the data hub module 313 organizes and arranges the data in a consumable hub that allows stored or streaming data to be processed for data science and ML solutions as generally described herein.

In some implementations, a data fusion module 314 receives data from the data hub module 313 and/or a component of the event engine 320 (e.g., event data storage module 325 described below. In further implementations, the data fusion module 314 collates the received data before providing the data to other modules as described herein. In particular, the data fusion module 314 then provides data directly into the data storage module 315, including raw data. In further implementations, the data fusion module 314 also provides information to the data curation module 316, which continuously leverages AI/ML technologies to crawl, wrangle, and define data from various sources, including public web, historical internal data, and any other such new data available through any systems that users provide permission to share and connect.

For example, the data curation module 316 may use a web crawler AI program. The web crawler AI may use one or more seeds (e.g., URLs, addresses, etc.) provided by a user and/or otherwise generated as entry points for the crawler. The data curation module 316 may send a request (e.g., an HTTP request) to the web server hosting the content at a given address. The server responds by sending back the requested web page along with any associated resources (such as images, CSS files, and JavaScript files. The data curation module 316 may then parse the content of the address to extract links and other relevant information.

In further implementations, the data storage module 315 may store any personalized and/or gathered data. In some implementations, the data storage module 315 may perform pre-processing operations (e.g., cleaning, organization, initial analysis, etc.) on the personalized data while in the data storage module 315 and/or prior to storing or transmitting the data. In some implementations, the data storage module 315 encrypts, encodes, and/or otherwise secures the data and ensures that the data is of high quality and accurate.

The system 300 additionally includes an event engine 320. Depending on the implementation, the event engine 320 includes a pattern identification module 321, an event data collection module 322, an event data prediction module 323, an event alignment module 324, and an event data storage module 325. Generally, the event engine 320 leverages ML algorithms to provide accurate event determinations and/or details. In particular, the event engine 320 is able to accurately identify life events timely, predict future events, and harmonize these events, while storing all personal and synthetic data securely in an encrypted repository. As such, the event engine 320 is able to provide personalized event solutions and help individuals plan for future events and/or goals.

In some implementations, the event engine 320 includes the pattern identification module 321. The pattern identification module 311 leverages machine learning algorithms to analyze large datasets, identify patterns, and make accurate predictions. In particular, the pattern identification module 321 is responsible for analyzing the data generated and/or gathered by the event data collection module 322 and/or event data prediction module 323, as well as determining which events are most likely to reoccur. Depending on the implementation, the pattern identification module utilizes one or more types of machine learning algorithms. For example, the pattern identification module 311 may utilize algorithms trained according to supervised learning techniques (e.g., classification or regression models), unsupervised learning techniques (e.g., clustering or dimensionality reduction models), semi-supervised learning, etc. Further, the pattern identification module 311 may utilize particular forms of training for machine learning algorithms and/or artificial intelligence, such as deep learning techniques, ensemble methods, nearest neighbor methods, anomaly detection, reinforcement learning, self-organizing maps, etc. Depending on the implementation, the pattern identification module 311 interfaces with a generative AI (e.g., using a large language model (LLM)) as described herein.

In further implementations, the event data collection module 322 connects to both internal and external sources to collect data on various life events (e.g., birth, graduation, marriage, job change, etc.). In some implementations, the event data collection module 322 analyzes data directly to detect and/or identify various events. In further implementations, the event data collection module 322 additionally or alternatively interfaces with the data engine 310 to receive analyzed and/or raw data from one or more input data sources as described herein. Depending on the implementation, the event data collection module 322 utilizes machine learning and/or AI techniques as described herein. In further implementations, the event data collection module 322 interfaces with the pattern identification module 321 to determine and/or identify events.

In further implementations, the event engine 320 includes an event data prediction module 323. Depending on the implementation, the event data prediction module 323 utilizes a machine learning predictor to define and/or otherwise predict personalized life events. In particular, the event data prediction module 323 uses historical data and other relevant information to create a profile of the individual and predict future life events. Depending on the implementation, the event data prediction module 323 may interface with the event data collection module 322, the pattern identification module 321, and/or the data engine 310 to generate predictions regarding potential future events (e.g., using past determined events, gathered user data, etc.). Depending on the implementation, the event data prediction module may utilize various forms of predictive models and/or techniques, such as linear regression models, polynomial regression models, logistic regression models, support vector machines, decision trees, random forests, naïve Bayes models, K-nearest neighbor models, exponential smoothing methods, feedforward neural networks, convolutional neural networks, gradient boosting, K-means clustering, reinforcement learning techniques, a combination of such, and/or any other techniques.

In some implementations, the event engine 320 includes an event alignment module 324. The event alignment module 324 may determine and ensure that all life events are aligned correctly and harmonized with each other. In particular, the event alignment module 324 may analyze any determined events for any inconsistencies or conflicts (e.g., mismatching dates, out of order events, impossible events, etc.) and resolves the misalignments to provide a seamless event orchestration solution. In some implementations, the event alignment module 324 automatically corrects misalignments by determining correct information from input and/or gathered data. In further implementations, the event alignment module 324 additionally or alternatively prompts a user to correct one or more misalignments manually.

In further implementations, the event engine 320 includes an event data storage module 325. Depending on the implementation, the event data storage module 325 may be or function as a storage for determined and/or predicted life events. In some implementations, the event data storage module 325 provides a comprehensive view of one or more life events for a user and allows for easy retrieval of such information. Depending on the implementation, the event data storage module 325 may interface with the data engine 310, recommendation engine 330, and/or dashboard engine 350.

In some implementations, the event data storage module 325 may include and/or interface with a generative AI (e.g., at the event data prediction module 323, the event alignment module 324, the dashboard engine 500, etc.) to generate and/or store event data in the form of a life story for easier understanding and/or consumption by a user. Depending on the implementation, the story may include elements of events that have happened; how past events could have been improved by particular forms of saving; what future events are predicted; how future events can be improved, ensured, or averted by way of financial decisions; etc.

As an example, the event engine 320 may function as follows. The pattern recognition module 321 may use ML techniques such as supervised, unsupervised, and semi-supervised learning to enable classification, ranking, clustering, and/or recommending systems. Similarly, the pattern recognition module 321 may utilize reinforcement learning to detect and select specific life events of a specific participant or a matched persona for the participant based on the information gathered from the data engine 310 (e.g., the data storage module 315). The selected personalized life events may then be codified and delivered to the event data collection module 322 and/or event data prediction module 323. The event data collection module 322 may leverage both internal data and external data (e.g., from social media, news, etc. sources that may provide newer and unknown life events) to scan for and capture new life events and life events patterns that are representative of a user. The event data collection module 322 may also identify and/or attempt to identify other patterns from similar groups with the features of the matched persona (e.g., as determined by data engine 310). Moreover, the event data prediction module 323 may generate predicted events and/or ensure that each identified event is transposed into personalized life stories and personalized expectations of benefits based on the captured user life change events.

Moreover, the event alignment module 324 constantly compares personal and group life events to detect any changes, updates, and/or improvements in the calculation of the life events. Through ML and harmonization alignment techniques, the event alignment module 324 may ensure that the previous versions and new versions of such life events and stories are compared and improved (e.g., through reinforcement learning models) to continuously enhance the benefits derived from the identified and/or predicted life events. Further, the event data storage module 325 securely saves and encrypts all personal and group life events, generating specific and well-defined life stories for each individual and group. The stories may enable better planning, education, awareness, and understanding of how such events can impact retirement planning for a particular user.

In some implementations, the system 300 additionally includes a recommendation engine 330. The recommendation engine 330 may function as an AI-enabled, dynamic savings and benefits calculator that includes several modules to properly prepare and analyze data for retirement planning and/or other such goals based on one or more life events (e.g., as determined by event engine 320). Depending on the implementation, the recommendation engine includes a data partitioning module 331, a model building module 332, a model update module 333, and/or a plurality of model management module 340.

In some implementations, the data partitioning module 331 generally partitions data retrieved from the data engine 310 and/or event engine 320. In particular, the data partitioning module 331 may ensure that data is properly prepared for AI consumption through feature engineering process and/or intelligent data partitioning. In some implementations, the data partitioning module 331 utilizes sample selection for a train-test-validate process (e.g., training, testing, and validating machine learning models of the model management module 340) and further performs data normalization and/or standardization. Further, the recommendation engine 330 includes a model building module 332 that uses pre-defined models to analyze data from the data partitioning module 331 and selects or builds new models to address (e.g., automatically) data complexity or lack of data.

In some implementations, the system 300 further includes a model update module 333. The model update module 333 may be and/or utilize a continuous refreshing and updating system powered through 3 components: a predictive update module 334, a prescriptive update module 335, and an output verification module 336. The predictive update module 334 may enable forecasting and predictions of potential changes in the outputs of the models at the model management module 340 and send an immediate calibration response to the model management module 340 to mitigate any risks. The prescriptive update module 335 may use models (e.g., an LLM) to identify recommended next actions for changes and misalignments predicted by the predictive update module 334, providing the user with alerts, education, and information to allow the user to accept specific life events changes or make manual updates when necessary. The output verification module 336 uses additional machine learning solutions training (e.g., LLM solutions training) on defined life events corpus of data (e.g., from the event data storage module 325 and/or data storage module 315) and uses models such as Generative Adversarial Networks (GAN) models to stop propagation of misalignments, errors, hallucinations, and/or other such mistakes that could cause errors in the machine learning models. In addition, the output verification module 336 may trigger alerts for any detected low confidence level life events from the model management module 340 and allow human investigation and approval of these events in order to continuously avoid any propagation and/or creation of errors. The model update module 333 updates the various models in the model management module 340 and ensures continuous life events optimization.

The model management module 340 may function as a network enabling dynamic savings and benefits calculators for the system 300. In some implementations, the model management module 340 includes a plurality of models that may function separately and/or in conjunction to generate action recommendations for a user. While the exemplary embodiment of FIG. 3 includes eight models (e.g., as described below), it will be understood that the model management module 340 may include additional, fewer, or alternate models.

In some implementations, the model management module 340 manages a retirement ML model 341, an analysis ML model 342, a goal planning ML model 343, a portfolio ML model 344, a tax planning ML model 345, a health planning ML model 346, a risk management ML model 347, a social security ML model 348, and/or other such models as appropriate. The retirement ML model 341 may enable personalization of retirement projections based on various scenarios and participant features. The analysis ML model 342 may continuously analyze incoming data to extract changes and insights to add value to existing data. The goal planning ML model 343 may generate multiple relevant retirement goals for each persona and/or user based on predefined scenarios (e.g., by the user) as well as on synthetic scenarios. The portfolio ML model 344 may forecast portfolio growth opportunities based on data from the analysis ML model 342 and optimizes portfolios continuously. The tax planning ML model 345 may be, include, and/or use models to predict tax scenarios and optimize retirement payment. The health planning ML model 346 may identify healthcare spending needs and update retirement opportunities. The risk management ML model 347 may forecast potential life event risks and provide insights to improve decision-making by a user. The social security ML model 348 may generate personalized scenarios for each participant using Social Security or other such information. It will be understood that the various models described herein may be trained as described herein and/or may include additional, fewer, or alternate models.

The system 300 may further include a dashboard engine 350, which aims to unify all life events and perspectives into an easily consumable and digestible format for participants using an intelligent and dynamic dashboard. In particular, the dashboard engine 350 may include a life event dashboard 351 and/or an intelligent user interface 352.

In some implementations, the event dashboard 351 leverages data from the event data storage module 325 and the recommendation engine 330 to classify, group, and pattern possible life events of a particular user. In particular, the event dashboard 351 may include a gamification platform to incentivize participants to engage in better retirement planning (e.g., by offering points, recommendations, goals, progress trackers, etc.). Moreover, in some implementations, the participant may utilize the life event dashboard 351 to play various games and/or scenarios that enable improvements in retirement savings through scenario customizations.

Moreover, the intelligent user interface 352 may provide an interactive and intuitive interface for interacting with the life event dashboard 351. In some implementations, the views are generated based on the user and/or user preferences, and may include text-based information, image-based information (e.g., graphs), video-based information (e.g., informatics), etc. Further, the intelligent user interface 352 may continuously learn from user feedback to redesign the views to illustrate the value of proactive life event planning with savings for retirement in mind and the impact it may have on user goals (e.g., retirement). Depending on the implementation, the dashboard engine 350 may interface with a user device to allow users to access and interact with the information provided by the event engine 320, recommendation engine 330, etc. Moreover, the dashboard engine 350 may assist a user in making informed decisions about user goal planning in the context of life events.

Figure 4:
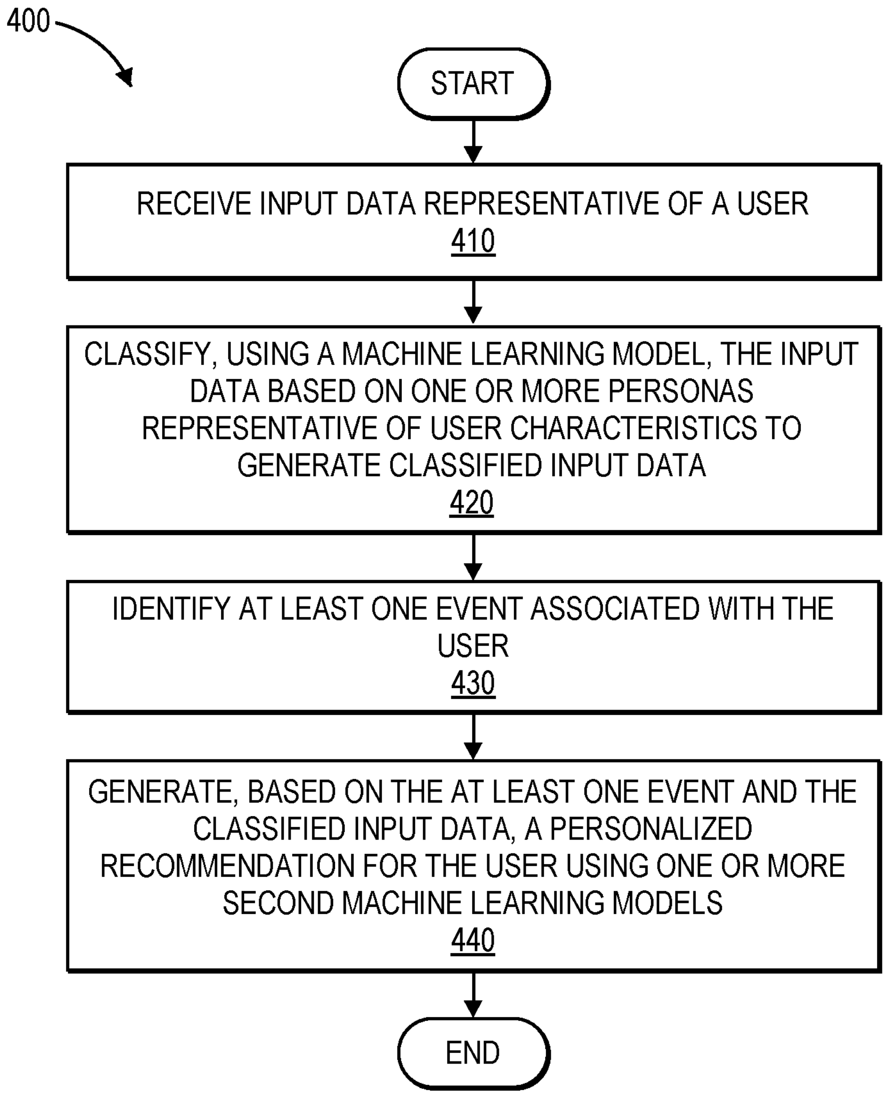
FIGS. 4-5 are flow diagrams of example methods to implement event-driven personalized recommendation systems, in accordance with some implementations of the present disclosure.

FIG. 4 is a flow diagram of an example method 400 to generate recommendations based on one or more detected events for a user, in accordance with some implementations of the present disclosure. Method 400 can be performed by at least one processing device that can include hardware (e.g., processing device, circuitry, dedicated logic, programmable logic, microcode, hardware of a device, integrated circuit, etc.), software (e.g., instructions run or executed on a processing device), or a combination thereof. In some implementations, method 400 is performed by one or more components of computing system 100 of FIG. 1A and/or system 300 of FIG. 3. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At block 410, the system receives input data representative of a user. In some implementations, the system may receive the input data from at least one data source. Depending on the implementation, the at least one data source may include an internal data source and/or an external data source, as described herein. In further implementations, the at least one data source may include an XR data source or a non-XR data source.

At block 420, the system classifies, using a machine learning model, the input data based on one or more personas representative of user characteristics to generate classified input data. The one or more personas may include at least one user persona representative of the user. Depending on the implementation, the one or more personas may be based on a career, a salary, a geographical location, etc.

At block 430, the system identifies at least one event associated with the user. In some implementations, the at least one event has an impact on a goal to be achieved by the user. Depending on the implementation, identifying the at least one event may include predicting, by the one or more processors, the at least one event based on the input data. In some such implementations, the system may perform the predicting using an additional machine learning model (e.g., as described above with regard to FIG. 3). In further implementations, identifying the at least one event includes receiving an indication of the at least one event from a user. Depending on the implementation, the indication may be a direct notification from the user (e.g., a user indicating an event responsive to a prompt, describing an event, selecting an event from a list, etc.) or an indirect notification (e.g., that the system determines by detecting an event in user-provided or user-allowed information).

At block 440, the system generates, based on the at least one event and the classified input data, a personalized recommendation for the user using one or more second machine learning models. In some implementations, the personalized recommendation comprises a set of actions predicted to achieve the goal based on the impact on the goal caused by the at least one event. In further implementations, generating the personalized recommendation includes comparing the user to other users within a same persona category (e.g., using the one or more second machine learning models). In still further implementations, the system may determine one or more actions based on the other users within the same persona category (e.g., by recommending similar actions, by determining actions contrary to negative actions taken by other users, to predict potential positive actions, etc.). In some implementations, as described herein, the one or more second machine learning models may include and/or interface with a generative AI (e.g., using an LLM).

In further implementations, the system identifies a misalignment between multiple events associated with the user. In still further implementation, the system remediates the misalignment, as described herein. In some implementations, the system further generates a personalized user recommendation display for the user and displays the personalized user recommendation display to the user. Depending on the implementation, the personalized user recommendation display may be based on one or more user preferences (e.g., a preference for visual displays such as graphs, a preference for textual recommendations, a preference for video-focused recommendations, etc.).

Figure 5:
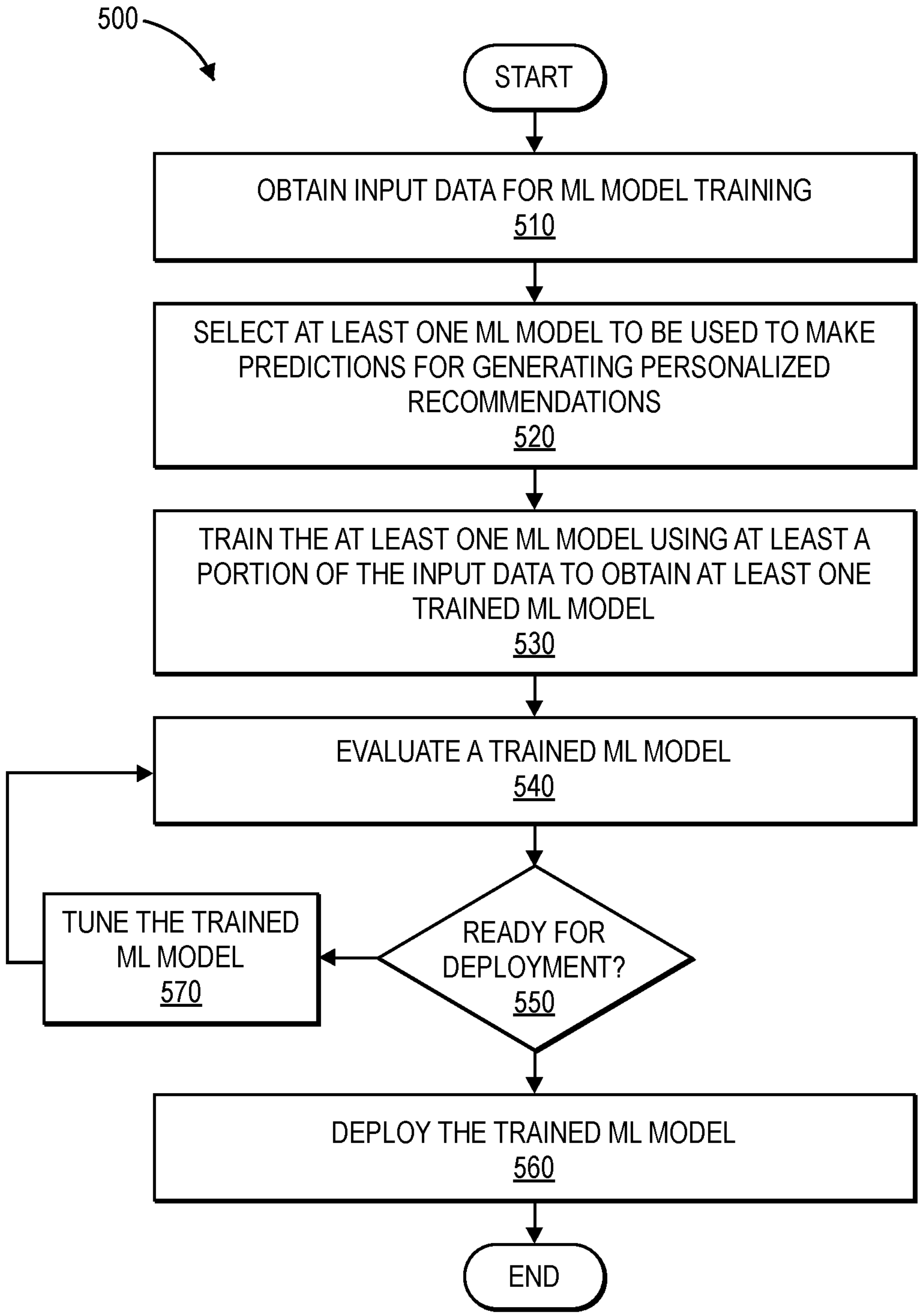

FIG. 5 is a flow diagram of an example method 500 to manage training and deployment of ML models implemented by event-driven personalized recommendations systems, in accordance with some implementations of the present disclosure. Method 500 can be performed by at least one processing device that can include hardware (e.g., processing device, circuitry, dedicated logic, programmable logic, microcode, hardware of a device, integrated circuit, etc.), software (e.g., instructions run or executed on a processing device), or a combination thereof. In some implementations, method 500 is performed by one or more components of computing system 100 of FIG. 1A. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At block 510, processing logic obtains input data for ML model training. Obtaining the input data can include ingesting data collected from a set of data sources and storing the ingested data as the input data. For example, the data collected from the set of data sources can include non-XR data obtained from a set of non-XR data sources (e.g., websites, applications, IoT devices and/or client devices). As another example, the data collected from the set of data sources can include XR data obtain from a set of XR data sources (e.g., VR systems, AR systems and/or MR systems). As yet another example, the data collected from the set of data sources can include synthetic data to simulate actual non-XR data and/or XR data. In some implementations, the data collected from set of data sources includes raw data, and obtaining the input data can further include preprocessing the raw data. For example, obtaining the input data can include performing, with respect to the raw data, at least one of: data cleaning, categorical variable encoding, dimensionality reduction, feature scaling, NLP, etc.

In some implementations, dimensionality reduction is performed to reduce dimensionality of features extracted from the raw data while preserving relevant information contained within the raw data. Dimensionality reduction can enable various improvements to the ability of a processing device to train the at least one ML model. For example, by reducing the number of features, dimensionality reduction can improve the computational efficiency and reduce storage resource consumption for training at least one ML model. As another example, dimensionality reduction can increase ML model prediction accuracy by filtering out irrelevant features within the raw data (e.g., noise). As yet another example, by reducing the dimensionality of the data, dimensionality reduction can mitigate effects of overfitting that may be observed by training the at least one ML model with higher-dimensional data. Overfitting refers to a phenomenon in which a ML model performs well on the input data used to train the at least one ML model, but not as well on new, unseen data. In some implementations, performing dimensionality reduction includes performing feature selection. Performing feature selection includes selecting, from a set of features, a subset of relevant features and discarding the remaining features of the set of features. In some implementations, performing dimensionality reduction includes performing feature extraction. Feature extraction includes transforming an initial set of features into a set of relevant features. For example, each feature of the set of relevant features obtained using feature extraction can be a linear combination of features of the initial set of features. In some implementations, performing dimensionality reduction includes performing matrix factorization. Examples of techniques that can be used to perform dimensionality reduction include Principal Component Analysis (PCA), Kernel PCA, Sparse PCA, Incremental PCA, Linear Discriminant Analysis (LDA), Independent Component Analysis (ICA), t-Distributed Stochastic Neighbor Embedding (t-SNE), autoencoding, Isometric Mapping (Isomap), Locally Linear Embedding (LLE), random linear projections, Truncated Singular Value Decomposition (SVD), matrix factorization, etc.

In some implementations, feature scaling is performed to normalize the scale of features of the set of features. A scale of a feature refers to the range of values that the feature can take within data. For example, an age feature can range from 0 to 100, while an income feature can range from 0 to 1,000,000. Feature scaling is performed since some ML models can be sensitive to feature scale. Feature scaling can improve computational efficiency by improving convergence speed and/or ML model performance. Examples of feature scaling techniques include min-max scaling to scale features to a range (e.g., between 0 and 1), Z-score scaling to transform features to have a mean of 0 and a standard deviation of 1, etc.

At block 520, processing logic selects at least one ML model to make predictions for generating personalized recommendations. Selection of a ML model can depend on various factors, such as the ML task (e.g., generalized personalized recommendations), computational resource availability, desired prediction accuracy, etc. In some implementations, the at least one ML model includes a predictive model. In some implementations, the at least one ML model includes at least one neural network (NN). For example, the at least one NN can include at least one of: a feedforward neural network (FNN), a recurrent neural network (RNN), a deep neural network (DNN), a convolutional neural network (CNN), etc. In some implementations, the at least one ML model includes a deep learning model.

In some implementations, the at least one ML model includes a collaborative filtering model to generate a personalized recommendation for a user. For example, a collaborative filtering model can be a user-based collaborative filtering model in which a personalized recommendation can be made for a user based on a cohort of similar users (e.g., users having similar data profiles, preferences, behaviors). As another example, a collaborative filtering model can be an item-based collaborative filtering model in which a personalized recommendation can be made for a user based on a similarity of items that the user had previously interacted with (e.g., shown interest in).

In some implementations, the at least one ML model includes a content-based filtering model to generate a personalized recommendation for a user. Generally, a content-based filter model generates a personalized recommendation for a user based on both attributes of items and preferences of the user. That is, a personalized recommendation generated by a content-based filtering model can generate a personalized recommendation for a user based on things that the user has already shown interest in.

In some implementations, the at least one ML model includes a hybrid model. For example, a hybrid model can combine collaborative filtering with another technique, such as content-based filtering.

In some implementations, a ML model is a supervised learning model that can be trained using a supervised learning method. A supervised learning method utilizes labeled training datasets to train a machine learning model to make predictions. More specifically, a supervised learning method can be provided with input data (e.g., features) and corresponding output data (e.g., target data), and the ML model learns to map the input data to the output data based on the examples in the labeled dataset. For example, to train the ML to perform a classification, the input data can include various attributes of an object or event, and the output data may be a label or category. The labeled dataset would contain examples of these objects or events along with their corresponding labels. The ML model would be trained to map the input data to the correct label by analyzing the examples in the labeled dataset. Examples of supervised learning methods include linear regression learning, logistic regression learning, decision tree learning, SVM learning, learning, gradient boosting learning, etc.

In some implementations, a ML model is an unsupervised learning model that can be trained using an unsupervised learning method. An unsupervised learning method trains a machine learning model to make predictions without using labeled training datasets. More specifically, a supervised learning method can be provided with input data (e.g., features) without corresponding output data (e.g., target data), and the ML model learns to map the input data to output data by identifying relationships (e.g., patterns) within the input data. For example, identifying relationships within the input data can include identifying groups of similar datapoints (e.g., clusters), or underlying structures within the input data. Examples of unsupervised learning methods include clustering (e.g., k-means clustering, principal component analysis (PAC), autoencoding, etc.

In some implementations, a ML model is a semi-supervised learning model that can be trained using semi-supervised learning. In contrast to supervised learning where the input data includes only labeled training datasets, and unsupervised learning where the input data does not include any labeled training datasets, semi-supervised learning involves training an ML model to make predictions using datasets that include a combination of labeled data and unlabeled data. Semi-supervised learning can be used to improve the accuracy of the ML model, such as in cases where obtaining a labeled data is expensive and/or time-consuming. For example, a labeled training dataset can be used to learn the structure of a machine learning modeling problem, and the unlabeled training dataset can be used to identify general features of the data. Examples of semi-supervised learning methods include self-training, co-training, and multi-view learning.

Self-training refers to a method in which labeled data of a dataset is used to train an initial ML model, and the initial ML model is then used to make label predictions for unlabeled data of the dataset. The most confidently predicted outputs can be added to the labeled data to obtain an expanded dataset, the ML model can then be retrained on the expanded dataset. The training process can stop when there is no additional improvement to ML model performance.

Co-training refers to a method in which each ML model of a group of ML models (e.g., a pair of ML models) is trained on a respective subset of labeled data of a dataset to predict labels of unlabeled data of the dataset. For example, each ML model can be a classifier model. The most confidently predicted outputs can be added to the labeled data to obtain an expanded dataset, and each ML model can be retrained using the expanded dataset. The training process can stop when each ML of the group of ML models converges and/or when there is no additional improvement to ML model performance.

Multi-view learning refers to a method in which multiple ML models are each trained on a respective view of data. Each view of data can be obtained in a particular way, such as using different feature representations, different sensors, or different modalities. The individual predictions made by the ML models can then be combined to make a final prediction.

In some implementations, the ML model is a reinforcement learning model that can be trained using reinforcement learning. Examples of reinforcement learning models include value-based models, policy-based models, model-based models, deep reinforcement learning models, multi-agent reinforcement learning models, etc.

At block 530, processing logic trains the at least one ML model using at least a portion of the input data to obtain a trained ML model. Generally, training a ML model involves adjusting the parameters of the ML model to minimize the difference between a prediction made by the ML model using the input data and corresponding ground truth. For example, a prediction made by a ML model using the input data can be a personalized recommendation predicted for a user, and the corresponding ground truth can be an actual personalized recommendation determined for the user. Examples of training techniques include gradient descent, backpropagation, etc. The at least one ML model can be trained using at least one of: supervised learning, unsupervised learning, semi-supervised learning, reinforcement learning, etc. In some implementations, training a ML model includes dividing the input data into multiple subsets, and training the ML model on each subset separately (e.g., cross-validation training).

In some implementations, training the at least one ML model includes using regularization technique to prevent overfitting and/or training instability during training. A regularization technique can increase ML model generalization and increase the speed of training convergence. For example, regularization technique can be applied to a deep learning model. Examples of regularization techniques include L1 regularization, L2 regularization, Elastic Net, dropout, batch normalization, etc. The choice of regularization technique can depend on the type of ML model, attributes of the data, etc.

At block 540, processing logic evaluates a trained ML model. For example, evaluating the trained ML model can include using the trained ML to make a set of predictions using a validation dataset and analyzing the set of predictions to obtain at least one performance metric. In some implementations, the at least one performance metric includes accuracy (e.g., a measure of the proportion of correct predictions of the set of predictions generated by the trained ML model). In some implementations, the at least one performance metric includes at least one of a precision metric or a recall metric (e.g., an F-score). In some implementations, evaluating the trained ML model includes generating a confusion matrix. A confusion matrix refers to a tabular data structure that compares, for a testing dataset, predicted outputs generated by an ML model ("predicted class") to actual outputs generated by the ML model ("actual class"). Entries within the confusion matrix can be used to determine true positives, false positives, true negatives and/or false negatives, which can be used to determine the at least one performance metric (e.g., accuracy, precision, recall and/or F-score).

At block 550, processing logic determines whether the trained ML model is ready for deployment. For example, determining whether the trained ML model is ready for deployment can include determining whether the at least one performance metric satisfies a threshold performance condition. For example, determining whether the at least one performance metric satisfies a threshold performance condition can include at least one of: determining whether an accuracy of a trained ML model is greater than or equal to a threshold accuracy, determining whether a precision of the trained ML model is greater than or equal to a threshold precision, determining whether a recall of the trained ML model is greater than or equal to a threshold recall, determining whether an F-score of the trained ML model is greater than or equal to a threshold F-score, etc.

If the trained ML model is determined be ready for deployment (e.g., the at least one performance metric satisfies the threshold performance condition), then processing logic at block 560 can deploy the trained ML model. For example, deploying the trained ML model can include storing the trained ML model, which can be accessible by an analytics system of a recommendation system to generate personalized recommendations. The trained ML model can be periodically updated over time (e.g., tuned) based on feedback data (e.g., non-XR data and/or XR data), as described above with reference to FIG. 4.

If the trained ML model is determined not to be ready for deployment (e.g., the at least one performance metric does not satisfy the threshold performance condition), then processing logic can tune the trained ML model to obtain a tuned ML model at block 570. In some implementations, tuning the trained ML model can include retraining the ML model using additional training data, similar to block 530. In some implementations, tuning the trained ML model can include tuning at least one hyperparameter of the trained ML model. The tuned ML model can then be evaluated at operation 540 to determine whether it is ready for deployment at block 550.

Depending on the implementation, blocks 540-570 can be repeated for any number of ML models that are being trained to generate personalized recommendations for users. Further details regarding blocks 510-570 are described above with reference to FIGS. 1A-4.

Figure 6:
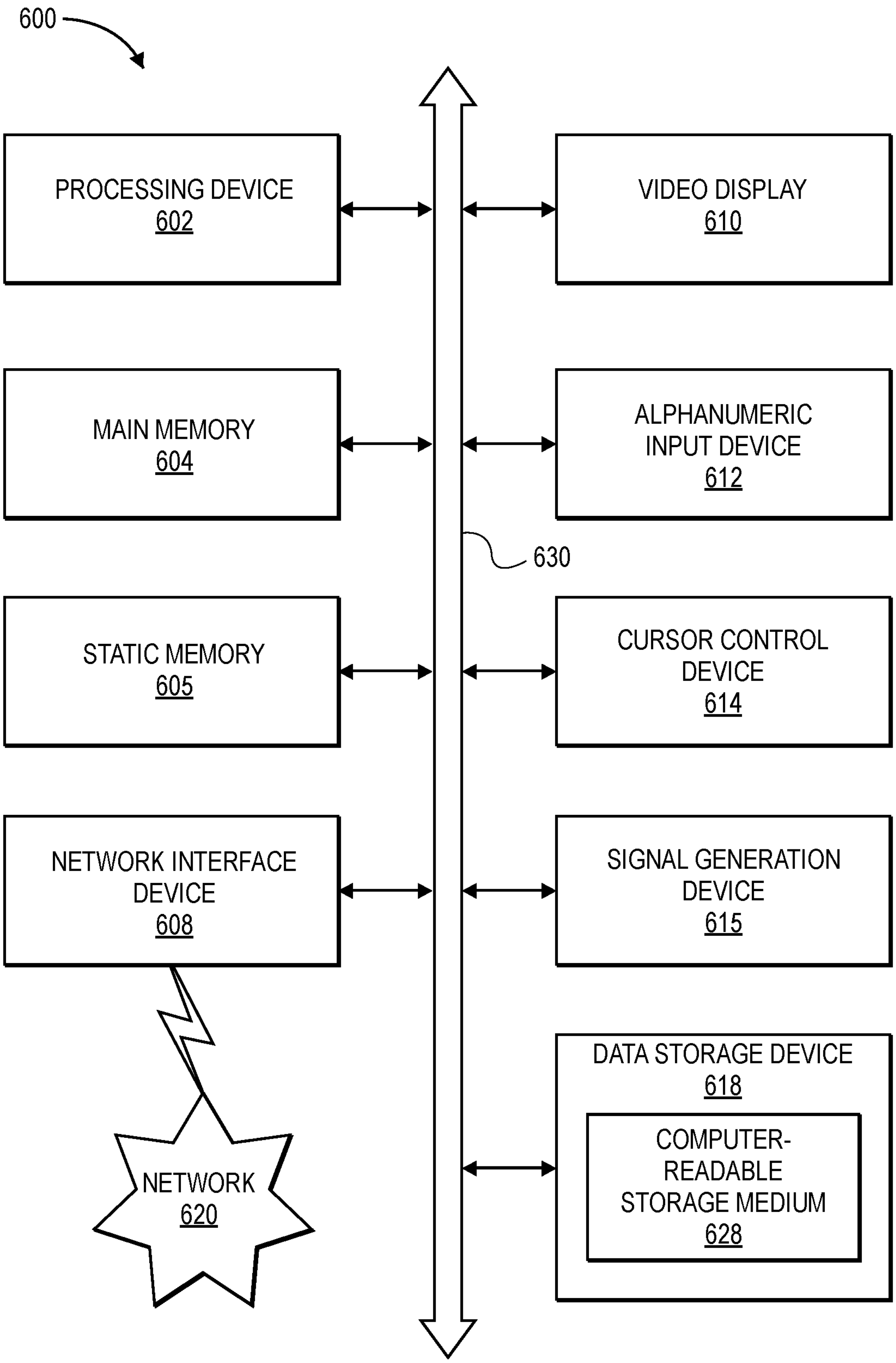
FIG. 6 is a block diagram of an example computer system in which implementations of the present disclosure may operate.

FIG. 6 illustrates a diagrammatic representation of a computer system 600, which may be employed for implementing the methods described herein. The computer system 600 may be connected to other computing devices in a LAN, an intranet, an extranet, and/or the Internet. The computer system 600 may operate in the capacity of a server machine in a client-server network environment. The computer system 600 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computer system" shall also be taken to include any collection of computing devices that individually or jointly execute a set (or multiple sets) of instructions to perform the methods discussed herein. In illustrative examples, the computer system 600 may represent one or more servers of a computing system implementing methods 300-500.

The example computer system 600 may include a processing device 602, a main memory 604 (e.g., synchronous dynamic random access memory (DRAM), read-only memory (ROM)), and a static memory 605 (e.g., flash memory and a data storage device 618), which may communicate with each other via a bus 630.

The processing device 602 may be provided by one or more general-purpose processing devices such as a microprocessor, central processing unit, or the like. In an illustrative example, the processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also comprise one or more special-purpose processing devices such as an application specific integrated circuit (ASIC), a field programmable gate array (FPGA), a digital signal processor (DSP), a network processor, or the like. The processing device 602 may be configured to execute methods of managing computing systems, in accordance with one or more aspects of the present disclosure.

The computer system 600 may further include a network interface device 608, which may communicate with a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and/or an acoustic signal generation device 615 (e.g., a speaker). In some embodiments, video display unit 610, alphanumeric input device 612, and cursor control device 614 may be combined into a single component or device (e.g., an LCD touch screen).

The data storage device 618 may include a computer-readable storage medium 628 on which may be stored one or more sets of instructions (e.g., instructions of the methods of automated review of communications, in accordance with one or more aspects of the present disclosure) implementing any one or more of the methods or functions described herein. The instructions may also reside, completely or at least partially, within main memory 604 and/or within processing device 602 during execution thereof by computer system 600, main memory 604 and processing device 602 also constituting computer-readable media. The instructions may further be transmitted or received over a network 620 via network interface device 608.

While computer-readable storage medium 628 is shown in an illustrative example to be a single medium, the term “computer-readable storage medium” shall be taken to include a single medium or multiple media (e.g., a centralized or distributed database and/or associated caches and servers) that store one or more sets of instructions. The term “computer-readable storage medium” shall also be taken to include any medium that is capable of storing, encoding or carrying a set of instructions for execution by the machine and that causes the machine to perform the methods described herein. The term “computer-readable storage medium” shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system’s registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory (“ROM”), random access memory (“RAM”), magnetic disk storage media, optical storage media, flash memory components, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A method for generating predictive and event-based action recommendations, the method comprising: receiving, by one or more processors and from at least one data source, input data representative of a user; classifying, by the one or more processors and using a first machine learning model, the input data based on one or more personas representative of user characteristics to generate classified input data, wherein the one or more personas include at least one user persona representative of the user; identifying, by the one or more processors and from the input data, at least one event associated with the user, wherein the at least one event has an impact on a goal to be achieved by the user; comparing, by the one or more processors and using one or more second machine learning models, the user to other users within a same persona category; and generating, by the one or more processors and based on the at least one event, the other users within the same persona category, and the classified input data, a personalized recommendation for the user using the one or more second machine learning models, wherein the personalized recommendation comprises a set of actions predicted to achieve the goal based on the impact on the goal caused by the at least one event.

2. The method of claim 1, further comprising:

identifying, by the one or more processors, a misalignment between multiple events associated with the user; and remediating, by the one or more processors, the misalignment.

3. The method of claim 1, wherein identifying the at least one event comprises:

predicting, by the one or more processors and using a third machine learning model, the at least one event based on the input data.

4. The method of claim 1, wherein identifying the at least one event comprises:

receiving, by the one or more processors, the at least one event from the user.

5. The method of claim 1, wherein the user characteristics include at least one of a user career or a user salary.

6. The method of claim 1, wherein generating the personalized recommendation comprises:

determining, by the one or more processors and using the one or more second machine learning models, one or more actions based on the other users within the same persona category.

7. The method of claim 1, wherein the at least one data source includes an extended reality (XR) data source.

8. The method of claim 1, wherein the one or more second machine learning models includes a generative artificial intelligence using a large language machine learning model.

9. The method of claim 1, further comprising:

generating, by the one or more processors, a personalized user recommendation display for the user; and displaying, by the one or more processors, the personalized user recommendation display to the user.

10. The method of claim 9, wherein generating the personalized user recommendation display is based on one or more user preferences.

11. A computing device configured to generate predictive and event-based action recommendations, the computing device comprising: one or more processors; and a non-transitory computer-readable medium coupled to the one or more processors and storing instructions thereon that, when executed by the one or more processors, cause the computing device to: receive, from at least one data source, input data representative of a user; classify, using a first machine learning model, the input data based on one or more personas representative of user characteristics to generate classified input data, wherein the one or more personas include at least one user persona representative of the user; identify, from the input data, at least one event associated with the user, wherein the at least one event has an impact on a goal to be achieved by the user; compare, using one or more second machine learning models, the user to other users within a same persona category; and generate, based on the at least one event, the other users within the same persona category, and the classified input data, a personalized recommendation for the user using the one or more second machine learning models, wherein the personalized recommendation comprises a set of actions predicted to achieve the goal based on the impact on the goal caused by the at least one event.

12. The computing device of claim 11, wherein the non-transitory computer-readable medium further stores instructions that, when executed by the one or more processors, cause the computing device to:

identify a misalignment between multiple events associated with the user; and remediate the misalignment.

13. The computing device of claim 11, wherein identifying the at least one event comprises:

predicting, using a third machine learning model, the at least one event based on the input data.

14. The computing device of claim 11, wherein identifying the at least one event comprises:

receiving the at least one event from the user.

15. The computing device of claim 11, wherein the user characteristics include at least one of a user career or a user salary.

16. The computing device of claim 11, wherein generating the personalized recommendation includes:

determining, using the one or more second machine learning models, one or more actions based on the other users within the same persona category.

17. The computing device of claim 11, wherein the at least one data source includes an extended reality (XR) data source.

18. The computing device of claim 11, wherein the one or more second machine learning models includes a generative artificial intelligence using a large language machine learning model.

19. The computing device of claim 11, wherein the non-transitory computer-readable medium further stores instructions that, when executed by the one or more processors, cause the computing device to:

generate a personalized user recommendation display for the user; and display the personalized user recommendation display to the user.

20. The computing device of claim 19, wherein generating the personalized user recommendation display is based on one or more user preferences.

* * * * *